United States Patent
Shin et al.

(10) Patent No.: US 11,404,721 B2
(45) Date of Patent: Aug. 2, 2022

(54) GEL POLYMER ELECTROLYTE COMPOSITION AND LITHIUM SECONDARY BATTERY INCLUDING THE SAME

(71) Applicant: LG CHEM, LTD., Seoul (KR)

(72) Inventors: Won Kyung Shin, Daejeon (KR); Kyoung Ho Ahn, Daejeon (KR); Chul Haeng Lee, Daejeon (KR); Jeong Woo Oh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 20 days.

(21) Appl. No.: 16/763,577

(22) PCT Filed: Nov. 30, 2018

(86) PCT No.: PCT/KR2018/015126
§ 371 (c)(1),
(2) Date: May 13, 2020

(87) PCT Pub. No.: WO2019/108034
PCT Pub. Date: Jun. 6, 2019

(65) Prior Publication Data
US 2020/0365939 A1 Nov. 19, 2020

(30) Foreign Application Priority Data
Dec. 1, 2017 (KR) .................. 10-2017-0164112
Nov. 30, 2018 (KR) .................. 10-2018-0151895

(51) Int. Cl.
| | | |
|---|---|---|
| *H01M 10/0565* | (2010.01) | |
| *C01G 53/00* | (2006.01) | |
| *C08F 20/36* | (2006.01) | |
| *H01M 4/505* | (2010.01) | |
| *H01M 4/525* | (2010.01) | |
| *H01M 10/0525* | (2010.01) | |

(52) U.S. Cl.
CPC ........ *H01M 10/0565* (2013.01); *C01G 53/50* (2013.01); *C08F 20/36* (2013.01); *H01M 4/505* (2013.01); *H01M 4/525* (2013.01); *H01M 10/0525* (2013.01); *C01P 2006/40* (2013.01); *H01M 2300/0025* (2013.01); *H01M 2300/0045* (2013.01); *H01M 2300/0085* (2013.01)

(58) Field of Classification Search
CPC .. H01M 10/0567; H01M 4/134; H01M 4/382; H01M 10/0565; H01M 4/505; H01M 4/525; H01M 10/0525; H01G 53/50; C08F 20/36
See application file for complete search history.

(56) References Cited

U.S. PATENT DOCUMENTS

| | | | |
|---|---|---|---|
| 7,064,174 B2* | 6/2006 | Lewis .................. | C07F 9/091 |
| | | | 528/38 |
| 10,243,239 B1 | 3/2019 | Ahn et al. | |
| 2011/0233532 A1* | 9/2011 | Sotzing ............... | H01L 51/0034 |
| | | | 257/40 |
| 2011/0287325 A1 | 11/2011 | Zaghib et al. | |
| 2013/0029232 A1 | 1/2013 | Zheng et al. | |
| 2014/0024792 A1* | 1/2014 | Sotzing ................... | C09K 9/02 |
| | | | 526/256 |
| 2014/0134501 A1 | 5/2014 | Li et al. | |
| 2016/0028111 A1 | 1/2016 | Ahn et al. | |
| 2017/0018806 A1* | 1/2017 | Shin .................. | H01M 10/0568 |
| 2017/0125868 A1 | 5/2017 | Kim et al. | |
| 2017/0204241 A1* | 7/2017 | Nicolay ............ | H01M 10/0565 |
| 2017/0229735 A1 | 8/2017 | Ahn et al. | |
| 2017/0331153 A1* | 11/2017 | Sun .................. | H01M 10/0568 |
| 2018/0254152 A1* | 9/2018 | Matsuo .................. | H01G 11/84 |
| 2019/0036162 A1* | 1/2019 | Oh ........................ | C08F 299/024 |
| 2019/0319299 A1* | 10/2019 | Amine .............. | H01M 10/0568 |
| 2020/0274197 A1* | 8/2020 | Shin .................. | H01M 10/052 |
| 2020/0295402 A1* | 9/2020 | Shin .................. | H01M 10/4235 |
| 2020/0365939 A1* | 11/2020 | Shin ........................ | C08F 20/36 |

FOREIGN PATENT DOCUMENTS

| | | |
|---|---|---|
| EP | 2917957 A1 | 9/2015 |
| EP | 3203565 A | 8/2017 |
| JP | H08-295715 A | 11/1996 |
| KR | 10-2011-0033106 A | 3/2011 |
| KR | 10-2012-0032821 A | 4/2012 |
| KR | 10-2013-0013985 A | 2/2013 |
| KR | 10-2015-0050508 A | 5/2015 |
| KR | 10-2015-0109185 A | 10/2015 |
| KR | 10-2016-0040127 A | 4/2016 |
| KR | 10-2016-0040128 A | 4/2016 |
| KR | 10-1716799 B1 | 3/2017 |
| KR | 10-2017-0052388 A | 5/2017 |
| KR | 10-2017-0113418 A | 10/2017 |
| WO | 2014/074118 A1 | 5/2014 |

OTHER PUBLICATIONS

International Search Report (with partial translation) and Written Opinion issued in corresponding International Patent Application No. PCT/KR2018/015126, dated Mar. 8, 2019.

* cited by examiner

*Primary Examiner* — Matthew J Merkling
(74) *Attorney, Agent, or Firm* — Morgan, Lewis & Bockius LLP

(57) ABSTRACT

The present invention relates to a gel polymer electrolyte composition for a lithium secondary battery and a secondary battery including the same, and particularly, to a gel polymer electrolyte composition for a lithium secondary battery, which includes a lithium salt, a non-aqueous organic solvent, an ionic liquid, an oligomer having a specific structure, a heat stabilizer, and a polymerization initiator, and a lithium secondary battery in which high-temperature stability is improved by including the same.

18 Claims, No Drawings

GEL POLYMER ELECTROLYTE COMPOSITION AND LITHIUM SECONDARY BATTERY INCLUDING THE SAME

CROSS-REFERENCE TO RELATED APPLICATIONS

This application claims the benefit of Korean Patent Application Nos. 2017-0164112, filed on Dec. 1, 2017, and 2018-0151895, filed on Nov. 30, 2018, in the Korean Intellectual Property Office, the disclosure of which is incorporated herein in its entirety by reference.

TECHNICAL FIELD

Technical Field

The present invention relates to a gel polymer electrolyte composition and a lithium secondary battery including the same.

Background Art

Demand for secondary batteries as an energy source has been significantly increased as demand with respect to portable electronic devices have rapidly increased, and, among these secondary batteries, lithium secondary batteries having high energy density, high operating potential, long cycle life, and low self-discharging rate have been commercialized and widely used.

Recently, in line with growing concerns about environmental issues, a significant amount of research into electric vehicles (EVs) and hybrid electric vehicles (HEVs), which may replace vehicles using fossil fuels, such as gasoline vehicle and diesel vehicle, one of major causes of air pollution, has been conducted. Nickel-metal hydride (Ni-MH) secondary batteries have mainly been used as power sources of the electric vehicles (EVs) and hybrid electric vehicles (HEVs), but research into the use of lithium secondary batteries having high energy density, high discharge voltage, and output stability has been actively conducted, and some of the research has been commercialized.

A lithium secondary battery has a structure, in which an electrode assembly including a positive electrode, a negative electrode, and a separator disposed between the positive electrode and the negative electrode is stacked or wound, and is configured by accommodating the electrode assembly into a battery case and injecting a non-aqueous electrolyte solution thereinto. Charging and discharging of the lithium secondary battery proceeds while a process is repeated in which lithium ions of the positive electrode are intercalated into and deintercalated from the negative electrode.

A liquid electrolyte solution including an organic solvent, in which an electrolyte salt is dissolved, has been mainly used as the non-aqueous electrolyte solution. However, the liquid electrolyte solution is disadvantageous in that the possibility of volatizing the organic solvent is not only high, but safety is also low due to combustion caused by increases in ambient temperature and temperature of the battery itself.

That is, in order to improve the energy density of the lithium secondary battery, a driving voltage of the battery must be increased, but, since the liquid electrolyte solution is oxidized and decomposed under a high-voltage condition of 4.3 V or more, an unstable film having a non-uniform composition is formed on a surface of the positive electrode. Since the formed film is not stably maintained during repeated charge and discharge to induce continuous oxidative decomposition of the electrolyte solution, this continuous decomposition reaction forms a thick resistive layer on the surface of the positive electrode and consumes lithium ions and electrons that contribute to reversible capacity, and thus, this causes a problem of reducing capacity of the positive electrode.

In particular, with respect to carbonate-based organic solvents used as a main solvent of the liquid electrolyte solution, since their flash points are low and volatility is high, the carbonate-based organic solvents easily cause a flame reaction when the temperature increases under misuse conditions of the battery and act as a fuel in a combustion reaction of an electrode active material. The combustion reaction between the electrode active material and the electrolyte solution rapidly increases the battery temperature to cause a thermal runaway phenomenon.

In order to address these limitations, a lithium polymer secondary battery, in which a gel polymer electrolyte having excellent electrochemical stability is used instead of the liquid electrolyte solution, has emerged.

However, the gel polymer electrolyte is disadvantageous in that it not only has lower ionic conductivity than the liquid electrolyte solution, but flame retardancy is also not easily secured due to a carbonate-based solvent included in the gel polymer electrolyte.

Thus, there is a need to develop a technique capable of preparing a gel polymer electrolyte having improved flame retardancy as well as oxidation resistance even at a high voltage.

PRIOR ART DOCUMENT

Korean Patent Application Laid-open Publication No. 2011-0033106

DISCLOSURE OF THE INVENTION

Technical Problem

An aspect of the present invention provides a gel polymer electrolyte composition for a lithium secondary battery in which thermal stability is improved.

Another aspect of the present invention provides a gel polymer electrolyte which is prepared by polymerizing the gel polymer electrolyte composition for a lithium secondary battery.

Another aspect of the present invention provides a lithium secondary battery in which high-temperature stability is improved by including the gel polymer electrolyte.

Technical Solution

According to an aspect of the present invention, there is provided a gel polymer electrolyte composition for a lithium secondary battery which includes a lithium salt, a non-aqueous organic solvent, an ionic liquid, an oligomer, a heat stabilizer, and a polymerization initiator, wherein the oligomer includes at least one selected from the group consisting of oligomers represented by Formula 1 and Formula 2 below.

[Formula 1]

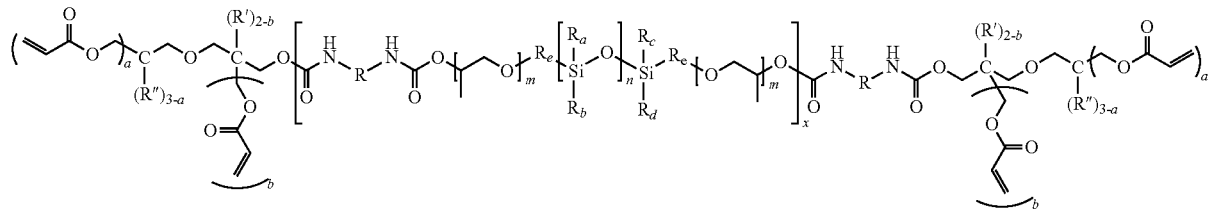

In Formula 1,

R is an aliphatic hydrocarbon group or an aromatic hydrocarbon group, $R_a$, $R_b$, $R_e$, and $R_d$ are each independently a substituted or unsubstituted alkyl group having 1 to 3 carbon atoms, $R_e$ is a substituted or unsubstituted alkylene group having 1 to 5 carbon atoms, R' and R'' are each independently hydrogen or an alkyl group having 1 to 3 carbon atoms, a is an integer of 1 to 3, b is an integer of 0 to 2, n, m, and x are numbers of repeating units, n is an integer of 1 to 10, m is an integer of 1 to 5, and x is an integer of 1 to 15.

[Formula 2]

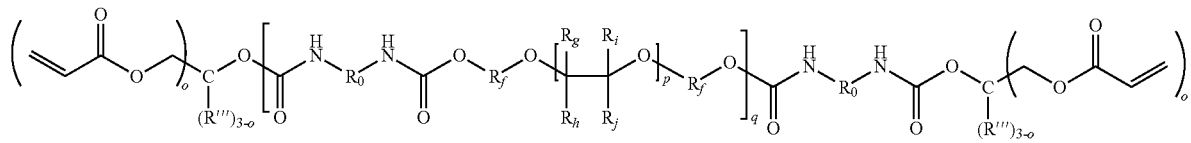

In Formula 2, $R_f$ is an alkylene group having 1 to 5 carbon atoms which is unsubstituted or substituted with at least one fluorine, $R_g$, $R_h$, $R_i$, and $R_j$ are each independently a fluorine element or a fluorine-substituted or unsubstituted alkyl group having 1 to 3 carbon atoms, $R_g$ is an aliphatic hydrocarbon group or an aromatic hydrocarbon group, R''' is hydrogen or an alkyl group having 1 to 3 carbon atoms, o is an integer of 1 to 3, p and q are numbers of repeating units, p is an integer of 1 to 10, and q is an integer of 1 to 15.

The ionic liquid may include at least one selected from the group consisting of $BF_4^-$, $PF_6^-$, $ClO_4^-$, bis(fluorosulfonyl) imide ($N(SO_2F)_2^-$; FSI), (bis)trifluoromethanesulfonimide ($N(SO_2CF_3)_2^-$, TFSI), bisperfluoroethanesulfonimide ($N(SO_2C_2F_5)_2^-$, BETI), and oxalyldifluoroborate ($BF_2(C_2O_4)^-$, ODFB) as an anion component, and may include at least one selected from the group consisting of cations represented by Formulae 3 to 7 as a cation component.

[Formula 3]

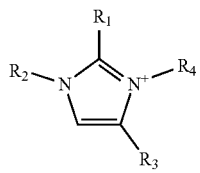

In Formula 3, $R_1$, $R_2$, $R_3$, and $R_4$ are each independently hydrogen or an alkyl group having 1 to 5 carbon atoms.

[Formula 4]

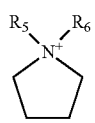

In Formula 4, $R_5$ and $R_6$ are each independently an alkyl group having 1 to 5 carbon atoms.

[Formula 5]

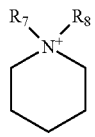

In Formula 5, $R_7$ and $R_8$ are each independently an alkyl group having 1 to 5 carbon atoms.

[Formula 6]

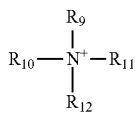

In Formula 6,
$R_9$, $R_{10}$, $R_{11}$, and $R_{12}$ are each independently an alkyl group having 1 to 5 carbon atoms.

[Formula 7]

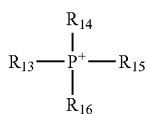

In Formula 7,
$R^{13}$, $R^{14}$, $R^{15}$, and $R^{16}$ are each independently an alkyl group having 1 to 5 carbon atoms.

The ionic liquid may be included in an amount of 1 wt % to 50 wt % based on a total weight of the gel polymer electrolyte composition for a lithium secondary battery.

Also, the oligomer represented by Formula 1 may be an oligomer represented by Formula 1a below.

[Formula 1a]

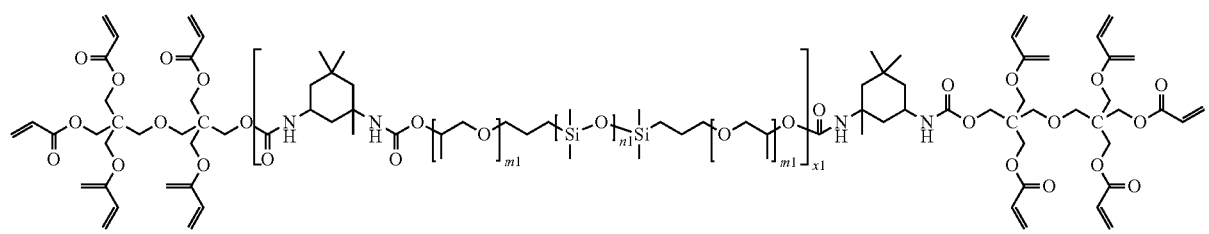

In Formula 1a,
n1, m1, and x1 are numbers of repeating units,
n1 is an integer of 1 to 10,
m1 is an integer of 1 to 5, and
x1 is an integer of 1 to 15.

Furthermore, the oligomer represented by Formula 2 may be an oligomer represented by Formula 2a below.

In Formula 2a,
p1 and q1 are numbers of repeating units,
p1 is an integer of 1 to 10, and
q1 is an integer of 1 to 15.

The oligomer may be included in an amount of 0.1 wt % to 30 wt % based on the total weight of the gel polymer electrolyte composition for a lithium secondary battery.

Also, the heat stabilizer may be a compound represented by Formula 8 below.

[Formula 8]

$$R_{17}\diagdown O \diagdown P \diagup O \diagup R_{18}$$
$$\phantom{R_{17}\diagdown O \diagdown} O \phantom{\diagup} $$
$$\phantom{R_{17}\diagdown O \diagdown} R_{19}$$

In Formula 8,
$R_{17}$, $R_{18}$, and $R_{19}$ are each independently any one selected from the group consisting of H, F, —$CH_2C(CH_3)_3$, —$CF_3$, —$CF_2CF_3$, —$C(CF_3)_3$, —$CH_2CF_3$, —$C(CF_2CF_3)_3$, Cl, —$CCl_3$, —$CH_2CCl_3$, —$CF_2CCl_3$, —$C(CCl_3)_3$, —$C(CCl_2CCl_3)_3$, Br, —$CBr_3$, —$CH_2CBr_3$, —$CBr_2CBr_3$, —$C(CBr_3)_3$, —$C(CBr_2CBr_3)_3$, —I, —$CI_3$, —$CI_2CI_3$, —$C(CI_3)_3$, —$C(CI_2CI_3)_3$, —$Si(CH_3)_3$, —$Si(CH_2CH_3)_3$, —$SiF_3$, —$Si(CF_3)_3$, and —$Si(CF_2CF_3)_3$.

The heat stabilizer may be included in an amount of 1 wt % to 30 wt % based on the total weight of the gel polymer electrolyte composition for a lithium secondary battery.

[Formula 2a]

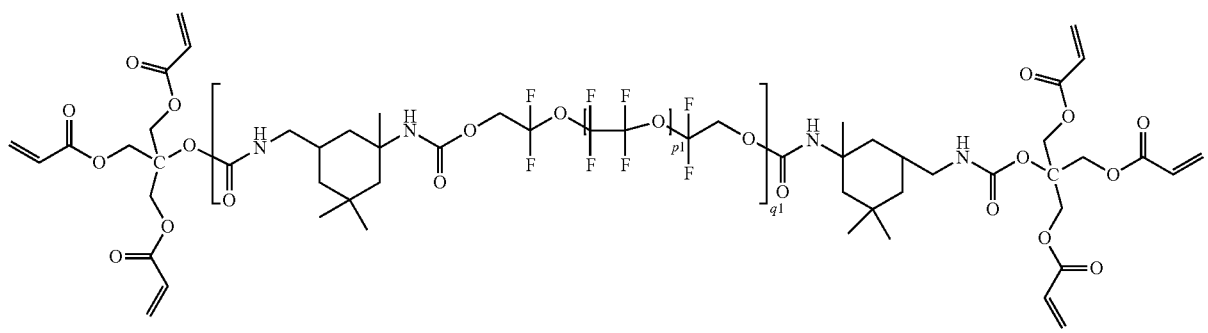

According to another aspect of the present invention, there is provided a gel polymer electrolyte which is prepared by polymerizing the gel polymer electrolyte composition of the present invention.

According to another aspect of the present invention, there is provided a lithium secondary battery including a positive electrode, a negative electrode, a separator, and the gel polymer electrolyte prepared in the present invention.

The positive electrode may include a positive electrode active material represented by Formula 9 below.

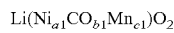   [Formula 9]

In Formula 9, $0.8 \leq a1 < 0.9$, $0.05 < b1 < 0.17$, $0.05 < c1 < 0.17$, and $a1+b1+c1=1$.

Advantageous Effects

According to the present invention, a composition for a gel polymer electrolyte having improved flame retardancy may be prepared by further including an oligomer having a specific structure, an ionic liquid, and a heat stabilizer in addition to a lithium salt and a non-aqueous organic solvent. Also, a lithium secondary battery including a gel polymer electrolyte having improved high-temperature stability may be prepared by using the composition for a gel polymer electrolyte.

In the present specification, the expression "%" denotes wt % unless explicitly stated otherwise.

Before describing the present invention, the expressions "a" and "b" in the description of "a to b carbon atoms" in the specification each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, $-CH_2-$, $CH_2CH_2-$, $-CH_2CH_2CH_2-$, $-CH_2(CH_2)CH_2-$, $-CH(CH_2)CH_2-$, and $-CH(CH_2)CH_2CH_2-$.

In this case, the expression "alkylene group" denotes a branched or unbranched aliphatic hydrocarbon group or a functional group in the form in which one hydrogen atom is removed from a carbon atom located at both ends of the aliphatic hydrocarbon group.

Specifically, in an embodiment of the present invention, provided is a gel polymer electrolyte composition for a lithium secondary battery which includes a lithium salt, a non-aqueous organic solvent, an ionic liquid, an oligomer, a heat stabilizer, and a polymerization initiator, wherein the oligomer is at least one selected from the group consisting of oligomers represented by Formula 1 and Formula 2 below.

[Formula 1]

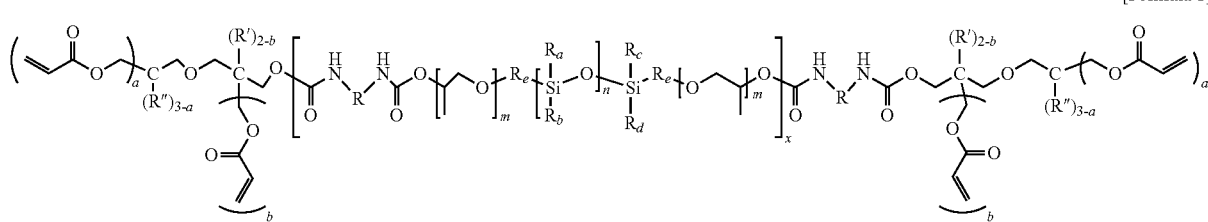

MODE FOR CARRYING OUT THE INVENTION

Hereinafter, the present invention will be described in more detail. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In Formula 1,

R is an aliphatic hydrocarbon group or an aromatic hydrocarbon group, $R_a$, $R_b$, $R_c$, and $R_d$ are each independently a substituted or unsubstituted alkyl group having 1 to 3 carbon atoms, $R_e$ is a substituted or unsubstituted alkylene group having 1 to 5 carbon atoms, R' and R" are each independently hydrogen or an alkyl group having 1 to 3 carbon atoms, a is an integer of 1 to 3, b is an integer of 0 to 2, n, m, and x are numbers of repeating units, n is an integer of 1 to 10, m is an integer of 1 to 5, and x is an integer of 1 to 15.

[Formula 2]

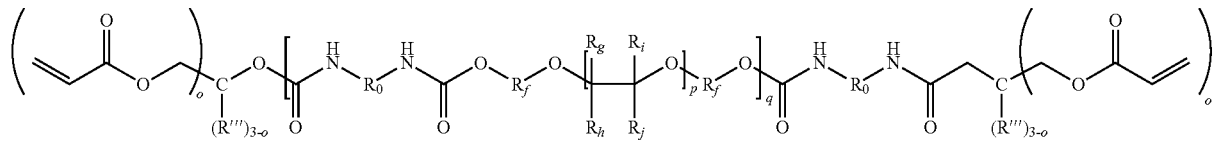

In Formula 2, $R_f$ is an alkylene group having 1 to 5 carbon atoms which is unsubstituted or substituted with at least one fluorine, $R_g$, $R_h$, $R_i$, and $R_j$ are each independently a fluorine element or a fluorine-substituted or unsubstituted alkyl group having 1 to 3 carbon atoms, $R_0$ is an aliphatic hydrocarbon group or an aromatic hydrocarbon group, $R'''$ is hydrogen or an alkyl group having 1 to 3 carbon atoms, o is an integer of 1 to 3, p and q are numbers of repeating units, p is an integer of 1 to 10, and q is an integer of 1 to 15.

(1) Lithium Salt

First, in the gel polymer electrolyte composition for a lithium secondary battery of the present invention, any lithium salt typically used in an electrolyte for a lithium secondary battery may be used as the lithium salt without limitation, and, specifically, the lithium salt may include $Li^+$ as a cation, and may include at least one selected from the group consisting of $BF_4^-$, $PF_6^-$, $ClO_4^-$, bis(fluorosulfonyl)imide ($N(SO_2F)_2^-$; FSI), (bis)trifluoromethanesulfonimide ($N(SO_2CF_3)_2^-$, TFSI), bisperfluoroethanesulfonimide ($N(SO_2C_2F_5)_2^-$, BETI), and oxalyldifluoroborate ($BF_2(C_2O_4)^-$, ODFB) as an anion. Specifically, the lithium salt may include at least one selected from the group consisting of $LiBF_4$, $LiPF_6$, $LiClO_4$, $LiN(SO_2F)_2$, $LiN(SO_2CF_3)_2$, $LiN(SO_2C_2F_5)_2$, and $LiBF_2(C_2O_4)$.

The lithium salt may be appropriately changed in a normally usable range, but may specifically be included in a concentration of 0.8 M to 3 M, for example, 1.0 M to 2.5 M in the gel polymer electrolyte composition. In a case in which the concentration of the lithium salt is greater than 3 M, since viscosity of the electrolyte is increased, a lithium ion-transfer effect in the gel polymer electrolyte may be reduced.

(2) Non-Aqueous Organic Solvent

Also, in the gel polymer electrolyte composition according to the embodiment of the present invention, a type of the non-aqueous organic solvent is not limited as long as the non-aqueous organic solvent may minimize decomposition due to an oxidation reaction during charge and discharge of the secondary battery and may exhibit desired characteristics with an additive, and, for example, as the non-aqueous organic solvent, a carbonate-based organic solvent, an ether-based organic solvent, or an ester-based organic solvent may be used alone or in mixture of two or more thereof.

The carbonate-based organic solvent among the organic solvents may include at least one selected from a cyclic carbonate-based organic solvent and a linear carbonate-based organic solvent. Specifically, the cyclic carbonate-based organic solvent may include at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), and may specifically include a mixed solvent of ethylene carbonate having high permittivity and propylene carbonate having a relatively lower melting point than the ethylene carbonate.

Also, the linear carbonate-based organic solvent, as a solvent with low viscosity and low permittivity, may include at least one selected from the group consisting of dimethyl carbonate (DMC), diethyl carbonate (DEC), dipropyl carbonate, ethylmethyl carbonate (EMC), methylpropyl carbonate, and ethylpropyl carbonate, and may specifically include dimethyl carbonate.

As the ether-based organic solvent, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

The ester-based organic solvent may include at least one selected from the group consisting of a linear ester-based organic solvent and a cyclic ester-based organic solvent.

In this case, specific examples of the linear ester-based organic solvent may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester-based organic solvent may be any one selected from the group consisting of γ-butyrolactone, γ-valerolactone, γ-caprolactone, σ-valerolactone, and ε-caprolactone, or a mixture of two or more thereof, but the present invention is not limited thereto.

A highly viscous cyclic carbonate-based organic solvent, which well dissociates the lithium salt in the electrolyte due to high permittivity, may be used as the organic solvent. Also, in order to prepare an electrolyte having higher electrical conductivity, the above cyclic carbonate-based organic solvent may be mixed with a low viscosity, low permittivity linear carbonate-based compound, such as dimethyl carbonate and diethyl carbonate, and a linear ester-based compound in an appropriate ratio and used as the organic solvent.

Specifically, a mixture of the cyclic carbonate-based compound and the linear carbonate-based compound may be used as the organic solvent, and a weight ratio of the cyclic carbonate-based compound to the linear carbonate-based compound in the organic solvent may be in a range of 10:90 to 70:30.

Also, since the gel polymer electrolyte composition for a lithium secondary battery of the present invention may minimize volatility of the organic solvent and may suppress flame retardancy by including an ionic liquid, oligomers represented by Formulae 1 and 2, and a heat stabilizer as described later in the non-aqueous organic solvent in which the lithium salt is dissolved, a gel polymer electrolyte capable of improving high-temperature stability of the battery may be prepared.

(3) Ionic Liquid

The ionic liquid included in the gel polymer electrolyte composition for a lithium secondary battery of the present invention may improve high-temperature safety of the gel polymer electrolyte composition and the gel polymer electrolyte prepared therefrom due to high oxidation stability and low possibility of ignition.

The ionic liquid may include at least one selected from the group consisting of $BF_4^-$, $PF_6^-$, $ClO_4^-$, bis(fluorosulfonyl)imide ($N(SO_2F)_2^-$; FSI), (bis)trifluoromethanesulfonimide ($N(SO_2CF_3)_2^-$, TFSI), bisperfluoroethanesulfonimide ($N(SO_2C_2F_5)_2^-$, BETI), and oxalyldifluoroborate ($BF_2(C_2O_4)^-$, ODFB), which are the same as the anion component of the lithium salt, as an anion component, and may include at least one selected from the group consisting of cations represented by Formulae 3 to 7 below as a cation component.

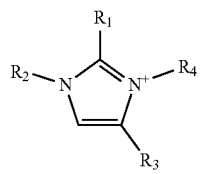

[Formula 3]

In Formula 3, $R_1$, $R_2$, $R_3$, and $R_4$ are each independently hydrogen or an alkyl group having 1 to 5 carbon atoms.

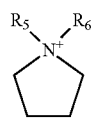

[Formula 4]

In Formula 4, $R_5$ and $R_6$ are each independently an alkyl group having 1 to 5 carbon atoms.

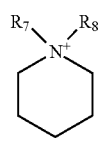

[Formula 5]

In Formula 5, $R_7$ and $R_8$ are each independently an alkyl group having 1 to 5 carbon atoms.

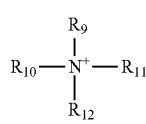

[Formula 6]

In Formula 6, $R_9$, $R_{10}$, $R_{11}$, and $R_{12}$ are each independently an alkyl group having 1 to 5 carbon atoms.

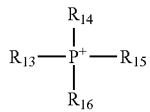

[Formula 7]

In Formula 7, $R_{13}$, $R_{14}$, $R_{15}$, and $R_{16}$ are each independently an alkyl group having 1 to 5 carbon atoms.

The cation represented by Formula 3 may include at least one selected from the group consisting of cations represented by Formulae 3a and 3b below.

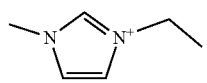

[Formula 3a]

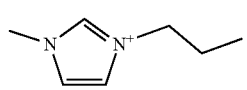

[Formula 3b]

Also, the cation represented by Formula 4 may include at least one selected from the group consisting of cations represented by Formulae 4a and 4b below.

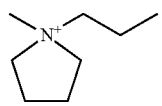

[Formula 4a]

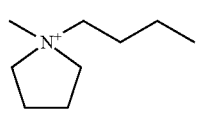

[Formula 4b]

Furthermore, the cation represented by Formula 5 may include at least one selected from the group consisting of cations represented by Formulae 5a and 5b below.

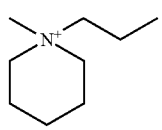

[Formula 5a]

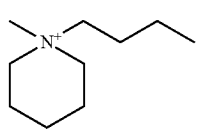

[Formula 5b]

In Formula 6, $R_9$, $R_{10}$, $R_{11}$, and $R_{12}$ are each independently an alkyl group having 1 to 3 carbon atoms.

Also, the cation represented by Formula 7 may be a cation represented by Formula 7a below.

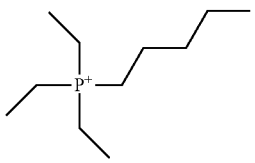

[Formula 7a]

The ionic liquid may be included in an amount of 1 wt % to 50 wt %, particularly 5 wt % to 40 wt %, and more particularly 10 wt % to 30 wt % based on a total weight of the gel polymer electrolyte composition for a lithium secondary battery.

When the amount of the ionic liquid is 50 wt % or less, wetting may be secured by preventing an increase in resistance due to a phenomenon of reduction of lithium ion migration caused by an increase in the viscosity of the electrolyte and, simultaneously, a disadvantage, such as a decrease in ionic conductivity, may be prevented by improving restriction of the movement of lithium ions. That is, since the ionic liquid has no self-extinguishing properties, the ionic liquid may be mixed with the gel polymer electrolyte composition to ensure high-temperature stability of the gel polymer electrolyte composition.

When the amount of the ionic liquid is less than 1 wt %, an effect of improving oxidation safety and flame retardancy may be insignificant. Also, since the ionic liquid has high viscosity, the viscosity of the gel polymer electrolyte composition is increased to reduce the wettability of the electrolyte when the ionic liquid is included at a level of co-solvent, for example, greater than 50 wt %, and thus, it is difficult to function as the electrolyte. Particularly, in a case in which the amount of the ionic liquid is increased, since a dielectric constant is reduced while the concentration of the salt in the gel polymer electrolyte composition for a lithium secondary battery is increased, a lithium salt dissociation ability is reduced, and thus, it is disadvantageous in that the lithium salt is not dissolved properly.

(4) Oligomer

Also, since the oligomer included in the gel polymer electrolyte composition for a lithium secondary battery of the present invention possesses the ability to dissociate the lithium salt, the oligomer may improve lithium ion mobility, and may suppress gas generation and ignition during overcharge by particularly controlling a side reaction of lithium ions (Lit) and a decomposition reaction of the lithium salt.

The oligomer may include at least one selected from oligomers represented by Formula 1 and Formula 2 below.

[Formula 1]

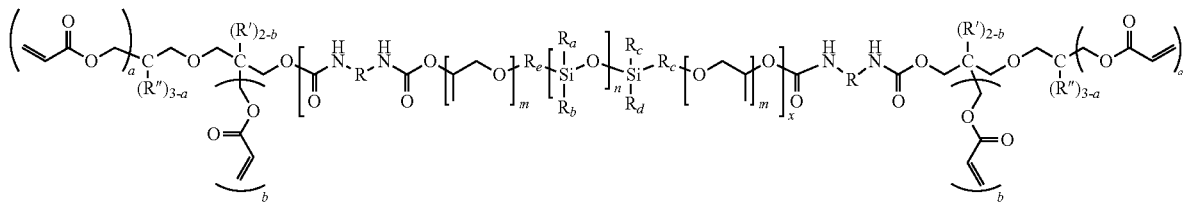

In Formula 1,

R is an aliphatic hydrocarbon group or an aromatic hydrocarbon group, $R_a$, $R_b$, $R_c$, and $R_d$ are each independently a substituted or unsubstituted alkyl group having 1 to 3 carbon atoms, $R_e$ is a substituted or unsubstituted alkylene group having 1 to 5 carbon atoms, R' and R" are each independently hydrogen or an alkyl group having 1 to 3 carbon atoms, a is an integer of 1 to 3, b is an integer of 0 to 2, n, m, and x are numbers of repeating units, n is an integer of 1 to 10, m is an integer of 1 to 5, and x is an integer of 1 to 15.

[Formula 2]

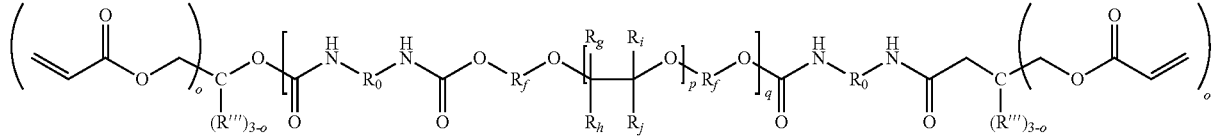

In Formula 2, $R_f$ is an alkylene group having 1 to 5 carbon atoms which is unsubstituted or substituted with at least one fluorine, $R_g$, $R_h$, $R_i$, and $R_j$ are each independently a fluorine element or a fluorine-substituted or unsubstituted alkyl group having 1 to 3 carbon atoms, $R_0$ is an aliphatic hydrocarbon group or an aromatic hydrocarbon group, R''' is hydrogen or an alkyl group having 1 to 3 carbon atoms, o is an integer of 1 to 3, p and q are numbers of repeating units, p is an integer of 1 to 10, and q is an integer of 1 to 15.

Specifically, in Formula 1 or Formula 2, the aliphatic hydrocarbon group of R or $R_0$ may include at least one selected from the group consisting of (a) at least one alicyclic hydrocarbon group and (b) at least one linear hydrocarbon group, wherein (a) the alicyclic hydrocarbon group is selected from the group consisting of a substituted or unsubstituted cycloalkylene group having 4 to carbon atoms, a substituted or unsubstituted cycloalkenylene group having 4 to 20 carbon atoms, and a substituted or unsubstituted heterocycloalkylene group having 2 to 20 carbon atoms, and (b) the linear hydrocarbon group is selected from the group consisting of a substituted or unsubstituted alkylene group having 1 to 20 carbon atoms, a substituted or unsubstituted alkoxylene group having 1 to 20 carbon atoms, a substituted or unsubstituted alkenylene group having 2 to 20 carbon atoms, and a substituted or unsubstituted alkynylene group having 2 to 20 carbon atoms.

Also, the aromatic hydrocarbon group of R or $R_0$ may include at least one selected from the group consisting of a substituted or unsubstituted arylene group having 6 to 20 carbon atoms and a substituted or unsubstituted heteroarylene group having 2 to 20 carbon atoms.

Specifically, the oligomer represented by Formula 1 may be an oligomer represented by Formula 1a below.

[Formula 1a]

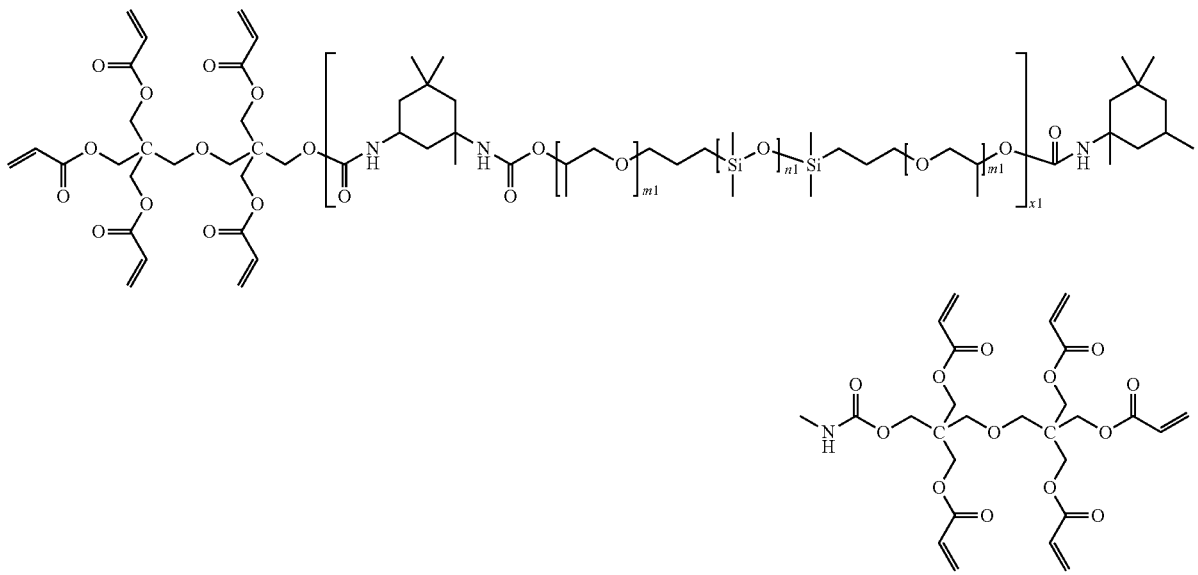

In Formula 1a, n1, m1, and x1 are numbers of repeating units, n1 is an integer of 1 to 10, m1 is an integer of 1 to 5, and x1 is an integer of 1 to 15.

Also, the oligomer represented by Formula 2 may be an oligomer represented by Formula 2a below.

[Formula 2a]

In Formula 2a,
p1 and q1 are numbers of repeating units,
p1 is an integer of 1 to 10, and
q1 is an integer of 1 to 15.

The oligomer may be included in an amount of 0.1 wt % to 30 wt %, particularly 0.5 wt % to 20 wt %, and more particularly 1 wt % to 10 wt % based on the total weight of the gel polymer electrolyte composition for a lithium secondary battery.

If the amount of the oligomer is 0.1 wt % or more, a gel polymer electrolyte having a stable network structure may be prepared, and, if the amount of the oligomer is 30 wt % or less, for example, 20 wt % or less, wettability may be secured by preventing an increase in resistance due to the addition of the excessive amount of the oligomer and, simultaneously, the decrease in ionic conductivity may be prevented by improving the restriction of the movement of lithium ions.

In a case in which the amount of the oligomer is greater than 30 wt %, the oligomer is not completely dissolved, but remains in the non-aqueous organic solvent to cause the increase in resistance. Particularly, since the oligomer has a low dielectric constant, the lithium salt is difficult to be uniformly dissolved in the gel polymer electrolyte composition when the amount of the oligomer is increased, and the ionic conductivity may be reduced because the lithium ion mobility is reduced due to a dense polymer matrix structure formed after curing.

A weight-average molecular weight (Mw) of the oligomer represented by Formula 1 or Formula 2 may be controlled by the number of repeating units, and may be in a range of about 1,000 g/mol to about 100,000 g/mol, particularly 1,000 g/mol to 50,000 g/mol, and more particularly 1,000 g/mol to 10,000 g/mol. In a case in which the weight-average molecular weight of the oligomer is within the above range, formation of a polymer matrix (network) may be facilitated to form a stable gel polymer electrolyte. Thus, high-temperature durability of the secondary battery may be effectively improved by suppressing ignition due to overcharge.

In a case in which the weight-average molecular weight of the oligomer is less than 1,000 g/mol, the formation of the polymer matrix may be difficult and mechanical strength of the gel polymer electrolyte may be reduced. In a case in which the weight-average molecular weight is greater than 100,000 g/mol, since physical properties of the oligomer itself become rigid and an affinity to an electrolyte solvent is reduced, dissolution is difficult, and thus, performance of the lithium secondary battery may be degraded.

The weight-average molecular weight may denote a standard polystyrene-equivalent value measured by gel permeation chromatography (GPC), and, unless otherwise specified, a molecular weight may denote the weight-average molecular weight. For example, in the present invention, the GPC conditions are as follows: the weight-average molecular weight is measured by using 1200 series by Agilent Technologies, a PL mixed B column by Agilent Technologies may be used in this case, and tetrahydrofuran (THF) may be used as a solvent.

Since the oligomer represented by Formula 1 or Formula 2 is electrochemically stable by exhibiting a balanced affinity for a positive electrode or separator (SRS layer), as a hydrophilic part, and a negative electrode or separator fabric, as a hydrophobic part, in the secondary battery, the oligomer may be a great help in improving the performance of the lithium secondary battery. That is, since the oligomer represented by Formula 1 contains a siloxane group (—Si—O—) and a urethane group (—N—C(O)O—), as a hydrophobic portion, as well as an acrylate-based functional group as a hydrophilic portion capable of forming a crosslink at both ends by itself and the oligomer represented by Formula 2 contains a fluorine-substituted ethylene group as a hydrophobic portion as well as an acrylate-based functional group as a hydrophilic portion capable of forming a crosslink at both ends by itself, the oligomer represented by Formula 1 or Formula 2 acts as a surfactant in the battery to be able to reduce surface resistance of an electrode interface. Therefore, the electrolyte for a lithium secondary battery including the oligomer represented by Formula 1 or Formula 2 may have a more improved wetting effect.

In addition, since the oligomer represented by Formula 1 or Formula 2 possesses the ability to dissociate the lithium salt, the oligomer may improve lithium ion mobility. Particularly, since it respectively contains a fluorine-substituted ethylene group or a siloxane group (—Si—O—) having high electrochemical stability and low reactivity with Li ions as a main chain repeating unit, it may control the side reaction of lithium ions (Li$^+$) and the decomposition reaction of the lithium salt, and thus, the generation of gas, such as CO or $CO_2$, during overcharge may be reduced. Accordingly, stability of the secondary battery may be improved by suppressing ignition during overcharge.

Therefore, with respect to a gel polymer electrolyte prepared by the gel polymer electrolyte composition of the present invention including the oligomer represented by Formula 1 or Formula 2 instead of a polymer having a skeleton of alkylene oxide, such as ethylene oxide, propylene oxide, or butylene oxide, which has been commercialized during the preparation of a conventional gel polymer electrolyte, or dialkyl siloxane, fluorosiloxane, or a graft polymer and a block copolymer having units thereof, since a side reaction with the electrode is reduced, an effect of stabilizing an interface between the electrode and the electrolyte may be achieved.

(5) Heat Stabilizer

Also, the gel polymer electrolyte composition according to the embodiment of the present invention may include a heat stabilizer to further improve incombustibility and high-temperature stability.

Oxygen present in the battery is a decisive factor for reducing a gel conversion rate of a monomer and/or an oligomer during gelation. That is, since a radical generated from a polymerization initiator easily reacts with oxygen and is consumed, polymerization reactivity for the gelation is reduced in the presence of oxygen.

Furthermore, the positive electrode of the lithium secondary battery is structurally unstable in an overcharged state, wherein, during exposure to high temperatures, such an unstable positive electrode structure easily collapses and releases oxygen radicals, and the generated oxygen radicals exothermically react with the electrolyte to cause thermal runaway of the battery. In addition, since the oxygen radical generates a supporting gas, such as ethylene or the like, by the reaction with the electrolyte, and generates oxygen in the battery, the oxygen radical causes ignition and explosion of the lithium secondary battery.

Thus, since the gel polymer electrolyte composition according to the embodiment of the present invention may more easily remove the oxygen in the battery by including the heat stabilizer that may act as an oxygen (O) radical scavenger, gelation reactivity during thermal polymerization and thermal stability during high-temperature storage, overcharge, and hot box test may be improved.

The heat stabilizer may include a phosphite-based compound represented by the following Formula 8 which may remove oxygen by bonding of the oxygen with unstable free radicals.

[Formula 8]

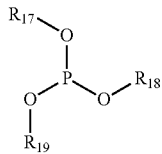

In Formula 8, $R_{17}$, $R_{18}$, and $R_{19}$ are each independently any one selected from the group consisting of H, F, —CH$_2$C(CH$_3$)$_3$, —CF$_3$, —CF$_2$CF$_3$, —C(CF$_3$)$_3$, —CH$_2$CF$_3$, —C(CF$_2$CF$_3$)$_3$, Cl, —CCl$_3$, —CH$_2$CCl$_3$, —CF$_2$CCl$_3$, —C(CCl$_3$)$_3$, —C(CCl$_2$CCl$_3$)$_3$, Br, —CBr$_3$, —CH$_2$CBr$_3$, —CBr$_2$CBr$_3$, —C(CBr$_3$)$_3$, —C(CBr$_2$CBr$_3$)$_3$, —I, —CI$_3$, —CI$_2$CI$_3$, —C(CI$_3$)$_3$, —C(CI$_2$CI$_3$)$_3$, —Si(CH$_3$)$_3$, —Si(CH$_2$CH$_3$)$_3$, —SiF$_3$, —Si(CF$_3$)$_3$, and —Si(CF$_2$CF$_3$)$_3$.

Specifically, the compound represented by Formula 8 may include at least one selected from the group consisting of compounds represented by Formulae 8a to 8f below.

[Formula 8a]

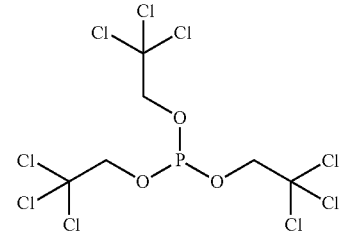

[Formula 8b]

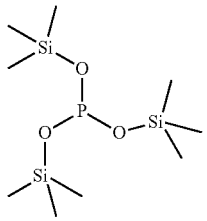

[Formula 8c]

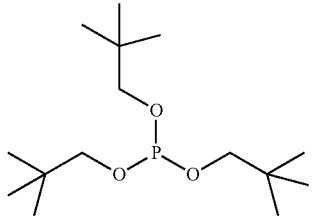

[Formula 8d]

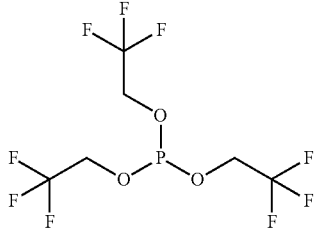

[Formula 8e]

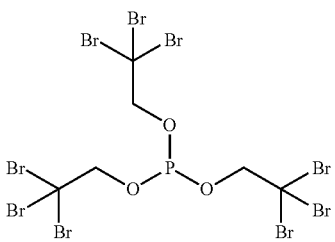

[Formula 8f]

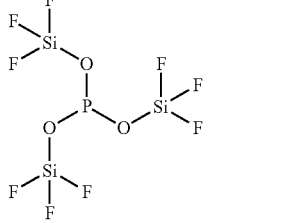

Specifically, among the above phosphite-based compounds, the heat stabilizer may include tris(2,2,2-trifluoroethyl)phosphite (TEEPi) represented by Formula 8c or tris(trimethylsilyl)phosphite (TMSPi) represented by Formula 8a, in which a fluorine element or silicon element is included in addition to a phosphite group that adsorbs oxygen radicals causing the combustion of a material.

Also, in addition to the phosphite-based compound, the heat stabilizer may further include at least one selected from the group consisting of triphenyl phosphite, diphenyl isodecyl phosphite, phenyl diisodecyl phosphite, 4,4'-butylidene-bis(3-methyl-6-t-butylphenyl-di-tridecyl)phosphite, tris(nonylphenyl)phosphite, tris(dinonyl)phosphite, dioctadecyl-3,5-di-t-butyl-4-hydroxybenzylphosphonate, and di-n-octadecyl-1-(3,5-di-t-butyl-4-hydroxyphenyl)ethane phosphonate, if necessary.

Since the heat stabilizer as described above has a phosphite structure in which three oxygen atoms are bonded around a phosphorus element, an oxygen radical may be removed by a reaction mechanism in which a phosphate compound is formed while the oxygen radical reacts with the phosphorus to form a new oxygen double bond.

Furthermore, the gel polymer electrolyte composition according to the embodiment of the present invention may further include at least one selected from the group consisting of a phenol-based compound, a cyclic amine-based compound, a semicarbazide-based compound, a nitro-based compound, an unsaturated hydrocarbon-based compound, and a thio-based compound as the heat stabilizer, if necessary.

Specifically, typical examples of the phenol-based compound may be 2,2-di(4'-hydroxyphenyl)propane, hydroquinone, p-methoxyphenol, t-butylhydroxy-anisole, n-octadecyl-3-(4-hydroxy-3,5-di-t-butyl-phenyl)propionate, pentaerythritol tetrakis-[3-(3,5-di-t-butyl-4-hydroxyphenyl)propionate], 1,2-propylene glycol bis-[3-(3,5-di-t-butyl-4-hydroxyphenyl)propionate], 2,5-di-t-butylhydroquinone, 4,4'-butylidenebis(3-methyl-6-t-butylphenol), 3,5-di-t-butyl-4-hydroxytoluene, 2,2'-methylene-bis(4-ethyl-6-t-butylphenol), triethylene glycol-bis-[3-(3-t-butyl-5-methyl-4-hydroxyphenyl)propionate], 2,6-di-t-butyl-4-methylphenol, t-butylcatechol, 4,4-thiobis(6-t-butyl-m-cresol), or nordihydroguaiaretic acid.

The cyclic amine-based compound may include phenylnaphthylamine, N,N'-diphenyl-p-phenylenediamine, or 4,4'-bis(dimethylbenzyl)diphenylamine.

Examples of the semicarbazide-based compound may be nitrate, sulfate, hydrofluoric acid, hydrochloride, formic acid, and oxalic acid of semicarbazide, or derivatives thereof, for example, 1-chloroacetyl-semicarbazide, 1-dichloroacetyl-semicarbazide, 1-benzoylsemicarbazide, or semicarbazone.

Examples of the nitro-based compound may be nitroanisole, N-nitrosodiphenylamine, nitroaniline, or N-nitrosophenylhydroxylamine aluminum salt.

Examples of the unsaturated hydrocarbon-based compound may be styrene, 1,3-hexadiene, or methyl styrene, and examples of the thio-based compound may be dilauryl thiodipropionate, dimyristyl thiodipropionate, distearyl thiodipropionate, dodecyl mercaptan, or 1,3-diphenyl-2-thiourea.

The heat stabilizer may be included in an amount of 1 wt % to 30 wt %, particularly 5 wt % to 25 wt %, and more particularly 10 wt % to 20 wt % based on the total weight of the gel polymer electrolyte composition for a lithium secondary battery.

In a case in which the amount of the heat stabilizer is less than 1 wt %, an effect of improving thermal stability may be insignificant. Also, if the amount of the heat stabilizer is 30 wt % or less, since the dielectric constant of the electrolyte may be appropriately maintained, the reduction of lithium ion migration may be prevented.

In a case in which the amount of the heat stabilizer is greater than 30 wt %, since the heat stabilizer increases the viscosity of the gel polymer electrolyte composition to reduce the mobility of lithium ions, the performance of the cell may be degraded. Furthermore, since the heat stabilizer has low polarity to have a low dielectric constant value, the lithium salt dissociation ability may decrease when an excessive amount of the heat stabilizer is included in the electrolyte, and thus, the lithium salt may not be dissolved properly.

(6) Polymerization Initiator

Furthermore, the gel polymer electrolyte composition of the present invention may include a conventional polymerization initiator capable of generating radicals by heat and light.

An azo-based polymerization initiator or a peroxide-based polymerization initiator may be used as the above polymerization initiator, and representative examples of the polymerization initiator may be at least one peroxide-based compound selected from the group consisting of benzoyl peroxide, acetyl peroxide, dilauryl peroxide, di-tert-butyl peroxide, t-butyl peroxy-2-ethyl-hexanoate, cumyl hydroperoxide, and hydrogen peroxide, or at least one azo-based compound selected from the group consisting of 2,2'-azobis (2-cyanobutane), dimethyl 2,2'-azobis(2-methylpropionate), 2,2'-azobis(methylbutyronitrile), 2,2'-azobis(iso-butyronitrile) (AIBN), and 2,2'-azobisdimethyl-valeronitrile (AMVN).

The polymerization initiator may form a radical by being decomposed by heat in the battery, for a non-limiting example, at a temperature of 30° C. to 100° C., for example, 60° C. to 80° C., or by being decomposed at room temperature (5° C. to 30° C.)

The polymerization initiator may be included in an amount of about 10 parts by weight or less, particularly 0.01 part by weight to 10 parts by weight, and more particularly 5 parts by weight based on total 100 parts by weight of the oligomer. In a case in which the amount of the polymerization initiator included is within the above range, since a gelation reaction is easily performed, it is possible to prevent the occurrence of gelation during the injection of the composition into the battery or to prevent the remaining unreacted polymerization initiator from causing a side reaction after the polymerization reaction.

Particularly, with respect to some polymerization initiators, nitrogen or oxygen gas may be generated in the process of radical generation by heat. This gas generation is most likely to lead to a gas trap or gas bubbling phenomenon in a gel polymer electrolyte formation process. Since the gas generation causes defects in the gel polymer electrolyte, it results in degradation of the electrolyte.

Thus, in the case that the polymerization initiator is included in an amount within the above range, it is possible to more effectively prevent a disadvantage such as generation of a large amount of gas.

(7) Additive

The gel polymer electrolyte composition according to the embodiment of the present invention may further include an additional additive which may form a stable film on surfaces of the negative electrode and the positive electrode while not significantly increasing initial resistance in addition to the effect from the ionic liquid, heat stabilizer, and oligomer, or which may act as a complementary agent for suppressing the decomposition of the organic solvent in the gel polymer electrolyte composition and improving the mobility of lithium ions.

The additional additive is not particularly limited as long as it is an additive for forming a solid electrolyte interface (SEI) which may form a stable film on the surfaces of the positive electrode and the negative electrode.

Specifically, as a representative example, the additive for forming an SEI may include at least one additive for forming an SEI which is selected from the group consisting of a halogen-substituted carbonate-based compound, a nitrile-based compound, a cyclic carbonate-based compound, a phosphate-based compound, a borate-based compound, and a lithium salt-based compound.

Specifically, the halogen-substituted carbonate-based compound may include fluoroethylene carbonate (FEC) and may be included in an amount of 5 wt % or less based on the total weight of the gel polymer electrolyte composition. In a case in which the amount of the halogen-substituted carbonate-based compound is greater than 5 wt %, cell swelling performance may deteriorate.

Also, the nitrile-based compound may include at least one compound selected from the group consisting of succinonitrile, adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

In a case in which the nitrile-based compound is used with the above-described mixed additive, an effect, such as an improvement of high-temperature characteristics, may be expected due to positive electrode/negative electrode film stabilization. That is, the nitrile-based compound may act as a complementary agent for forming the negative electrode SEI, may play a role in suppressing the decomposition of the solvent in the electrolyte, and may play a role in improving the mobility of the lithium ions. The nitrile-based compound may be included in an amount of 8 wt % or less based on the total weight of the gel polymer electrolyte composition. In a case in which the total amount of the nitrile-based compound in the non-aqueous electrolyte solution is greater than 8 wt %, since the resistance is increased due to an increase in the film formed on the surface of the electrode, battery performance may deteriorate.

The carbonate-based compound may improve durability of the battery by forming a stable SEI mainly on the surface of the negative electrode during battery activation. The cyclic carbonate-based compound may include vinylene carbonate (VC) or vinyl ethylene carbonate, and may be included in an amount of 3 wt % or less based on the total weight of the gel polymer electrolyte composition. In a case in which the amount of the cyclic carbonate-based compound in the gel polymer electrolyte composition is greater than 3 wt %, cell swelling inhibition performance and initial resistance may deteriorate.

Furthermore, since the phosphate-based compound stabilizes $PF_6$ anions in the gel polymer electrolyte composition and assists in the formation of the positive electrode and negative electrode films, the phosphate-based compound may improve the durability of the battery. The phosphate-based compound may include at least one compound selected from the group consisting of lithium difluoro bis(oxalato)phosphate (LiDFOP), lithium difluorophosphate (LiDFP, $LiPO_2F_2$), lithium tetrafluoro(oxalato)phosphate (LiTFOP), trimethylsilyl phosphite (TMSPi), tris(2,2,2-trifluoroethyl)phosphate (TFEPa), and tris(trifluoroethyl)phosphite (TFEPi), and the phosphate-based compound may be included in an amount of 3 wt % or less based on the total weight of the gel polymer electrolyte composition.

Since the borate-based compound promotes ion-pair separation of the lithium salt, the borate-based compound may improve the mobility of lithium ions, may reduce the interfacial resistance of the SEI, and may dissociate a material, such as LiF, which may be formed during the battery reaction but is not well separated, and thus, a problem, such as generation of hydrofluoric acid gas, may be solved. The borate-based compound may include lithium bis(oxalato)borate (LiBOB, $LiB(C_2O_4)_2$), lithium oxalyldifluoroborate, or tris(trimethylsilyl)borate (TMSB), and the borate-based compound may be included in an amount of 3 wt % or less based on the total weight of the gel polymer electrolyte composition.

Also, the lithium salt-based compound is a compound different from the lithium salt included in the gel polymer electrolyte composition, wherein the lithium salt-based compound may include at least one compound selected from the group consisting of LiODFB and $LiBF_4$ and may be included in an amount of 3 wt % or less based on the total weight of the gel polymer electrolyte composition.

Two or more additives for forming an SEI may be mixed and used, and the additive for forming an SEI may be included in an amount of 10 wt % or less, and particularly 0.01 wt % to 10 wt %, for example, 0.1 wt % to 5.0 wt % based on a total amount of the gel polymer electrolyte composition.

In a case in which the amount of the additive for forming an SEI is less than 0.01 wt %, high-temperature storage characteristics and gas generation reducing effect to be achieved from the additive may be insignificant, and, in a case in which the amount of the additive for forming an SEI is greater than 10 wt %, the side reaction in the gel polymer electrolyte composition during charge and discharge of the battery may excessively occur. Particularly, if the excessive amount of the additive for forming an SEI is added, the additive for forming an SEI may not be sufficiently decomposed so that it may be present in the form of an unreacted material or precipitates in the gel polymer electrolyte composition at room temperature. Accordingly, resistance may be increased to degrade life characteristics of the secondary battery.

Gel Polymer Electrolyte

Also, in an embodiment of the present invention, a gel polymer electrolyte, which is prepared by polymerizing the gel polymer electrolyte composition for a lithium secondary battery of the present invention in an inert atmosphere, may be provided.

The gel polymer electrolyte of the present invention should have an elastic modulus of at least 100 Pa or more to be able to maintain in the form of a gel, and, specifically, it is more desirable to have an elastic modulus of 1,000 Pa or more, for example, 3,000 Pa or more in order to exhibit excellent performance in the lithium secondary battery.

The elastic modulus was measured in a frequency range of 0.1 Hz to 10 Hz using a rotational rheometer (DHR2).

Specifically, after injecting the gel polymer electrolyte composition into the secondary battery, the gel polymer electrolyte may be prepared by curing by thermal polymerization.

For example, the gel polymer electrolyte may be formed by in-situ polymerization of the gel polymer electrolyte composition in the secondary battery.

Specifically, the gel polymer electrolyte may be prepared by the steps of:

(a) inserting an electrode assembly composed of a positive electrode, a negative electrode, and a separator disposed between the positive electrode and the negative electrode into a battery case;

(b) injecting the gel polymer electrolyte composition of the present invention into the battery case;

(c) wetting and aging the electrode assembly; and (d) polymerizing the gel polymer electrolyte composition to form a gel polymer electrolyte.

In this case, an in-situ polymerization reaction in the lithium secondary battery may be performed by using electron beam (E-beam), γ-ray, and room temperature or high temperature aging processes, and, according to an embodiment of the present invention, the in-situ polymerization reaction may be performed by thermal polymerization. In this case, polymerization time required may be in a range of about 2 minutes to about 48 hours, and thermal polymerization temperature may be in a range of 60° C. to 100° C., for example, 60° C. to 80° C.

Specifically, in the in-situ polymerization reaction in the lithium secondary battery, the polymerization initiator as well as the oligomer, ionic liquid, and heat stabilizer are added to the non-aqueous organic solvent, in which the lithium salt is dissolved, and mixed, and the mixture is then injected into a battery cell. After an electrolyte injection hole of the battery cell is sealed, the gel polymer electrolyte of the present invention may be prepared by performing thermal polymerization in which the battery cell is heated to about 60° C. to about 80° C. for 1 hour to 20 hours.

Lithium Secondary Battery

Furthermore, in an embodiment of the present invention, provided is a lithium secondary battery including a negative electrode, a positive electrode, a separator disposed between the negative electrode and the positive electrode, and the gel polymer electrolyte of the present invention prepared by the above-described method.

The lithium secondary battery according to the embodiment of the present invention has a charge voltage ranging from 3.0 V to 5.0 V, and thus, capacity characteristics of the lithium secondary battery may be excellent in both normal and high voltage ranges.

Also, since a quality deterioration phenomenon occurring during storage and transportation of the electrolyte is reduced, overall costs may be reduced and long-term storage stability under high temperature and high voltage may be further improved.

Specifically, in the lithium secondary battery of the present invention, an electrode assembly may be formed by sequentially stacking the positive electrode, the negative electrode, and the separator disposed between the positive electrode and the negative electrode. In this case, those prepared by typical methods and used in the preparation of the lithium secondary battery may all be used as the positive electrode, the negative electrode, and the separator which constitute the electrode assembly.

(1) Positive Electrode

First, the positive electrode may be prepared by forming a positive electrode material mixture layer on a positive electrode collector. The positive electrode material mixture layer may be prepared by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a transition metal oxide represented by Formula 9 in which an amount of nickel (Ni) is 0.8 or more.

$$Li(Ni_{a1}Co_{b1}Mn_{c1})O_2 \quad \text{[Formula 9]}$$

(in Formula 9,
$0.8 \leq a1 < 0.9$, $0.05 < b1 < 0.17$, $0.05 < c1 < 0.17$, and $a1+b1+c1=1$.)

Specifically, the positive electrode active material is a transition metal oxide having a high Ni content, wherein the positive electrode active material, for example, may include $Li(Ni_{0.8}Mn_{0.1}CO_{0.1})O_2$.

Since structural stability of the transition metal oxide having a high Ni content as described above is insufficient due to heat, the transition metal oxide having a high Ni content is disadvantageous in that the positive electrode is degraded during thermal curing for the preparation of the gel polymer electrolyte. Furthermore, since the gel polymer electrolyte has insufficient oxidation stability, HF, one of side reaction products of the electrolyte, attacks the positive electrode active material having a high Ni content to reduce a positive electrode component during the operation of the battery.

Thus, since the gel polymer electrolyte including the ionic liquid with a low degree of dissociation of transition metal is used in the present invention, dissolution of the transition metal from the positive electrode active material may be suppressed. Furthermore, since a side reaction at an interface between the electrode and the electrolyte may be prevented by using the gel polymer electrolyte having excellent oxidation stability, a secondary battery having improved high-temperature storage characteristics may be prepared.

In addition to the lithium-nickel-manganese-cobalt-based oxide in which the amount of nickel is 0.8 or more, the positive electrode active material may further include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.7}Mn_{0.15}Co_{0.15})O_2$, and $Li(Ni_{0.5}Mn_{0.3}CO_{0.2})O_2$), or lithium nickel cobalt aluminum oxide (e.g., $LiNi_{0.8}Co_{0.15}Al_{0.05}O_2$, etc.).

The positive electrode active material may be included in an amount of 80 wt % to 99 wt o, for example, 85 wt % to 95 wt % based on a total weight of solid content in the positive electrode slurry. In a case in which the amount of the positive electrode active material is 80 wt % or less, since energy density is decreased, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

Any conductive agent may be used as the conductive agent without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 1 wt % to 30 wt % based on the total weight of the solid content in the positive electrode slurry.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 70 wt %, for example, 20 wt % to 60 wt %.

(2) Negative Electrode

Also, the negative electrode may be prepared by forming a negative electrode material mixture layer on a negative electrode collector. The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_{x5}Fe_2O_3$ (0≤x≤51), $Li_{x6}WO_2$ (0≤x≤61), and $Sn_{x7}Me_{1-x7}Me'_{y4}O_{z4}$ (Me: manganese (Mn), Fe, Pb, or Ge; Me': Al, boron (B), phosphorus (P), Si, Groups I, II and III elements of the periodic table, or halogen; 0<x7≤1; 1≤y4≤3; 1≤z4≤8) may be used as the metal composite oxide.

The material, which may be doped and undoped with lithium, may include Si, $SiO_{x8}$ (0<x8≤2), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the slurry including the negative electrode active material as well as selectively the binder and the conductive agent is in a range of 50 wt % to 75 wt %, for example, 50 wt % to 65 wt %.

(3) Separator

Also, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Preparation of Gel Polymer Electrolyte Composition for Lithium Secondary Battery)

A gel polymer electrolyte composition was prepared by adding 20 g of ethylmethylimidazolium-bis(fluorosulfonyl)imide (EMI-FIS), 5 g of the oligomer represented by Formula 1a (weight-average molecular weight (Mw): 3,000, n1=5, m1=5, x1=10), 10 g of the compound represented by Formula 8c as a heat stabilizer, and 0.01 g of dimethyl 2,2'-azobis(2-methylpropionate) (CAS No. 2589-57-3), as a polymerization initiator, to 64.99 g of a non-aqueous organic solvent (ethylene carbonate (EC):ethyl methyl carbonate (EMC)=volume ratio of 3:7) in which 1.0 M LiFSI was dissolved.

(Electrode Assembly Preparation)

$Li(Ni_{0.8}Mn_{0.1}CO_{0.1})O_2$ as a positive electrode active material, carbon black, and polyvinylidene fluoride (PVDF) were added in a weight ratio of 94:3:3 to N-methyl-2-pyrrolidone (NMP), as a solvent, to prepare a positive electrode mixture slurry. An about 20 μm thick aluminum (Al) thin film, as a positive electrode collector, was coated with the positive electrode mixture slurry and dried, and the coated Al thin film was then roll-pressed to prepare a positive electrode.

Graphite as a negative electrode active material, PVDF, and carbon black were added in a weight ratio of 96:3:1 to NMP, as a solvent, to prepare a negative electrode mixture slurry. A 10 μm thick copper (Cu) thin film, as a negative electrode collector, was coated with the negative electrode mixture slurry and dried, and the coated Cu thin film was then roll-pressed to prepare a negative electrode.

An electrode assembly was prepared by sequentially stacking the positive electrode, a separator formed of three layers of polypropylene/polyethylene/polypropylene (PP/PE/PP), and the negative electrode.

(Secondary Battery Preparation)

After the assembled electrode assembly was put in a battery case and the above-prepared gel polymer electrolyte composition for a lithium secondary battery was injected thereinto, thermal polymerization was performed at 60° C. for 24 hours, and the battery case was then stored at room temperature for 2 days to prepare a lithium secondary battery including a gel polymer electrolyte for a lithium secondary battery.

Example 2

A gel polymer electrolyte composition for a lithium secondary battery and a lithium secondary battery including a gel polymer electrolyte prepared therefrom were prepared in the same manner as in Example 1 except that methylpropylpyrrolidinium-bis(fluorosulfonyl)imide (Pyr13-FSI), instead of the ethylmethylimidazolium-bis(fluorosulfonyl)imide (EMI-FIS), was used as an ionic liquid during the preparation of the gel polymer electrolyte composition for a lithium secondary battery (see Table 1 below).

Example 3

A gel polymer electrolyte composition for a lithium secondary battery and a lithium secondary battery including a gel polymer electrolyte prepared therefrom were prepared in the same manner as in Example 1 except that the compound of Formula 8a, instead of the compound of Formula 8c, was used as a heat stabilizer during the preparation of the gel polymer electrolyte in Example 1 (see Table 1 below).

Example 4

A gel polymer electrolyte composition for a lithium secondary battery and a lithium secondary battery including a gel polymer electrolyte prepared therefrom were prepared in the same manner as in Example 1 except that the oligomer represented by Formula 2a (weight-average molecular weight (Mw): 5,000, p1=5, q1=10), instead of the oligomer represented by Formula 1a, was used as an oligomer during the preparation of the gel polymer electrolyte composition for a lithium secondary battery (see Table 1 below).

Example 5

A gel polymer electrolyte composition for a lithium secondary battery and a lithium secondary battery including a gel polymer electrolyte prepared therefrom were prepared in the same manner as in Example 2 except that the oligomer represented by Formula 2a (weight-average molecular weight (Mw): 5,000, p1=5, q1=10), instead of the oligomer represented by Formula 1a, was used as an oligomer during the preparation of the gel polymer electrolyte composition for a lithium secondary battery (see Table 1 below).

Example 6

A gel polymer electrolyte composition for a lithium secondary battery and a lithium secondary battery including a gel polymer electrolyte prepared therefrom were prepared in the same manner as in Example 3 except that the oligomer represented by Formula 2a (weight-average molecular weight (Mw): 5,000, p1=5, q1=10), instead of the oligomer represented by Formula 1a, was used as an oligomer during the preparation of the gel polymer electrolyte composition for a lithium secondary battery (see Table 1 below).

Example 7

(Preparation of Gel Polymer Electrolyte Composition for Lithium Secondary Battery)

A gel polymer electrolyte composition was prepared by adding 50 g of ethylmethylimidazolium-bis(fluorosulfonyl) imide (EMI-FIS) as an ionic liquid, 5 g of the oligomer represented by Formula 1a (weight-average molecular weight (Mw): 3,000, n1=5, m1=5, x1=10), 10 g of the compound of Formula 8c as a heat stabilizer, and 0.01 g of dimethyl 2,2'-azobis(2-methylpropionate) (CAS No. 2589-57-3), as a polymerization initiator, to 34.99 g of a non-aqueous organic solvent (EC:EMC=volume ratio of 3:7) in which 1.0 M LiFSI was dissolved (see Table 1 below).

(Secondary Battery Preparation)

A lithium secondary battery including a gel polymer electrolyte was prepared in the same manner as in Example 1 except that the above-prepared gel polymer electrolyte composition was used.

Example 8

(Preparation of Gel Polymer Electrolyte Composition for Lithium Secondary Battery)

A gel polymer electrolyte composition was prepared by adding 5 g of ethylmethylimidazolium-bis(fluorosulfonyl) imide (EMI-FIS) as an ionic liquid, 30 g of the oligomer represented by Formula 1a (weight-average molecular weight (Mw): 3,000, n1=5, m1=5, x1=10), 10 g of the compound of Formula 8c as a heat stabilizer, and 0.01 g of dimethyl 2,2'-azobis(2-methylpropionate) (CAS No. 2589-57-3), as a polymerization initiator, to 54.99 g of a non-aqueous organic solvent (EC:EMC=volume ratio of 3:7) in which 1.0 M LiFSI was dissolved (see Table 1 below).

(Secondary Battery Preparation)

A lithium secondary battery including a gel polymer electrolyte was prepared in the same manner as in Example 1 except that the above-prepared gel polymer electrolyte composition was used.

Example 9

(Preparation of Gel Polymer Electrolyte Composition for Lithium Secondary Battery)

A gel polymer electrolyte composition was prepared by adding 10 g of ethylmethylimidazolium-bis(fluorosulfonyl) imide (EMI-FIS) as an ionic liquid, 5 g of the oligomer represented by Formula 1a (weight-average molecular weight (Mw): 3,000, n1=5, m1=5, x1=10), 30 g of the compound of Formula 8c as a heat stabilizer, and 0.01 g of dimethyl 2,2'-azobis(2-methylpropionate), as a polymerization initiator, to 54.99 g of a non-aqueous organic solvent (EC:EMC=volume ratio of 3:7) in which 1.0 M LiFSI was dissolved (see Table 1 below).

(Secondary Battery Preparation)

A lithium secondary battery including a gel polymer electrolyte was prepared in the same manner as in Example 1 except that the above-prepared gel polymer electrolyte composition was used.

Example 10

(Preparation of Gel Polymer Electrolyte Composition for Lithium Secondary Battery)

A gel polymer electrolyte composition was prepared by adding 1 g of ethylmethylimidazolium-bis(fluorosulfonyl) imide (EMI-FIS) as an ionic liquid, 0.5 g of the oligomer represented by Formula 1a (weight-average molecular weight (Mw): 3,000, n1=5, m1=5, x1=10), 1 g of the compound of Formula 8c as a heat stabilizer, and 0.01 g of dimethyl 2,2'-azobis(2-methylpropionate), as a polymerization initiator, to 97.49 g of a non-aqueous organic solvent (EC:EMC=volume ratio of 3:7) in which 1.0 M LiFSI was dissolved (see Table 1 below).

(Secondary Battery Preparation)

A lithium secondary battery including a gel polymer electrolyte was prepared in the same manner as in Example 1 except that the above-prepared gel polymer electrolyte composition was used.

Example 11

(Preparation of Gel Polymer Electrolyte Composition for Lithium Secondary Battery)

A gel polymer electrolyte composition was prepared by adding 30 g of ethylmethylimidazolium-bis(fluorosulfonyl) imide (EMI-FIS) as an ionic liquid, 20 g of the oligomer represented by Formula 1a (weight-average molecular weight (Mw): 3,000, n1=5, m1=5, x1=10), 10 g of the compound of Formula 8c as a heat stabilizer, and 0.01 g of dimethyl 2,2'-azobis(2-methylpropionate), as a polymerization initiator, to 39.99 g of a non-aqueous organic solvent (EC:EMC=volume ratio of 3:7) in which 1.0 M LiFSI was dissolved (see Table 1 below).

(Secondary Battery Preparation)

A lithium secondary battery including a gel polymer electrolyte was prepared in the same manner as in Example 1 except that the above-prepared gel polymer electrolyte composition was used.

Comparative Example 1

(Preparation of Gel Polymer Electrolyte Composition)

A gel polymer electrolyte composition was prepared by adding 5 g of the oligomer represented by Formula 1a (weight-average molecular weight (Mw): 3,000, n1=5, m1=5, x1=10) and 0.01 g of dimethyl 2,2'-azobis(2-methylpropionate), as a polymerization initiator, to 94.99 g of a non-aqueous organic solvent (EC:EMC=volume ratio of 3:7) in which 1.0 M LiFSI was dissolved.

(Secondary Battery Preparation)

A lithium secondary battery including a gel polymer electrolyte was prepared in the same manner as in Example 1 except that the above-prepared gel polymer electrolyte composition was used.

Comparative Example 2

(Preparation of Gel Polymer Electrolyte Composition)

A gel polymer electrolyte composition was prepared by adding 20 g of ethylmethylimidazolium-bis(fluorosulfonyl) imide (EMI-FIS) as an ionic liquid, 5 g of the oligomer represented by Formula 1a (weight-average molecular weight (Mw): 3,000, n1=5, m1=5, x1=10), and 0.01 g of dimethyl 2,2'-azobis(2-methylpropionate), as a polymerization initiator, to 74.99 g of a non-aqueous organic solvent (EC:EMC=volume ratio of 3:7) in which 1.0 M LiFSI was dissolved (see Table 1 below).

(Secondary Battery Preparation)

A lithium secondary battery including a gel polymer electrolyte was prepared in the same manner as in Example 1 except that the above-prepared gel polymer electrolyte composition was used.

Comparative Example 3

A gel polymer electrolyte composition for a lithium secondary battery and a lithium secondary battery including a gel polymer electrolyte prepared therefrom were prepared in the same manner as in Comparative Example 2 except that methylpropylpyrrolidinium-bis(fluorosulfonyl)imide (Pyr13-FSI), instead of the ethylmethylimidazolium-bis(fluorosulfonyl)imide (EMI-FIS), was used as an ionic liquid during the preparation of the gel polymer electrolyte composition for a lithium secondary battery (see Table 1 below).

Comparative Example 4

(Preparation of Gel Polymer Electrolyte Composition)

A gel polymer electrolyte composition was prepared by adding 5 g of the oligomer represented by Formula 1a (weight-average molecular weight (Mw): 3,000, n1=5, m1=5, x1=10), 10 g of the compound of Formula 8c as a heat stabilizer, and 0.01 g of dimethyl 2,2'-azobis(2-methylpropionate), as a polymerization initiator, to 84.99 g of a non-aqueous organic solvent (EC:EMC=volume ratio of 3:7) in which 1.0 M LiFSI was dissolved (see Table 1 below).

(Secondary Battery Preparation)

A lithium secondary battery including a gel polymer electrolyte was prepared in the same manner as in Example 1 except that the above-prepared gel polymer electrolyte composition was used.

TABLE 1

| | Positive electrode active material | Lithium salt | Non-aqueous solvent type | Amount added (g) | Ionic liquid type | Amount added (g) |
|---|---|---|---|---|---|---|
| Example 1 | $Li(Ni_{0.8}Mn_{0.1}Co_{0.1})O_2$ | 1M LiFSI | EC:EMC = 3:7 | 64.99 | EMI-FIS | 20 |
| Example 2 | $Li(Ni_{0.8}Mn_{0.1}Co_{0.1})O_2$ | 1M LiFSI | EC:EMC = 3:7 | 64.99 | Pyr13-FSI | 20 |
| Example 3 | $Li(Ni_{0.8}Mn_{0.1}Co_{0.1})O_2$ | 1M LiFSI | EC:EMC = 3:7 | 64.99 | EMI-FIS | 20 |
| Example 4 | $Li(Ni_{0.8}Mn_{0.1}Co_{0.1})O_2$ | 1M LiFSI | EC:EMC = 3:7 | 64.99 | EMI-FIS | 20 |
| Example 5 | $Li(Ni_{0.8}Mn_{0.1}Co_{0.1})O_2$ | 1M LiFSI | EC:EMC = 3:7 | 64.99 | Pyr13-FSI | 20 |
| Example 6 | $Li(Ni_{0.8}Mn_{0.1}Co_{0.1})O_2$ | 1M LiFSI | EC:EMC = 3:7 | 64.99 | EMI-FIS | 20 |
| Example 7 | $Li(Ni_{0.8}Mn_{0.1}Co_{0.1})O_2$ | 1M LiFSI | EC:EMC = 3:7 | 34.99 | EMI-FIS | 50 |
| Example 8 | $Li(Ni_{0.8}Mn_{0.1}Co_{0.1})O_2$ | 1M LiFSI | EC:EMC = 3:7 | 54.99 | EMI-FIS | 5 |
| Example 9 | $Li(Ni_{0.8}Mn_{0.1}Co_{0.1})O_2$ | 1M LiFSI | EC:EMC = 3:7 | 54.99 | EMI-FIS | 10 |
| Example 10 | $Li(Ni_{0.8}Mn_{0.1}Co_{0.1})O_2$ | 1M LiFSI | EC:EMC = 3:7 | 97.49 | EMI-FIS | 1 |
| Example 11 | $Li(Ni_{0.8}Mn_{0.1}Co_{0.1})O_2$ | 1M LiFSI | EC:EMC = 3:7 | 39.99 | EMI-FIS | 30 |
| Comparative Example 1 | $Li(Ni_{0.8}Mn_{0.1}Co_{0.1})O_2$ | 1M LiFSI | EC:EMC = 3:7 | 94.99 | — | — |
| Comparative Example 2 | $Li(Ni_{0.8}Mn_{0.1}Co_{0.1})O_2$ | 1M LiFSI | EC:EMC = 3:7 | 74.99 | EMI-FIS | 20 |
| Comparative Example 3 | $Li(Ni_{0.8}Mn_{0.1}Co_{0.1})O_2$ | 1M LiFSI | EC:EMC = 3:7 | 74.99 | Pyr13-FSI | 20 |
| Comparative Example 4 | $Li(Ni_{0.8}Mn_{0.1}Co_{0.1})O_2$ | 1M LiFSI | EC:EMC = 3:7 | 84.99 | — | — |

| | Oligomer Formula | Amount added (g) | Heat stabilizer Formula | Amount added (g) |
|---|---|---|---|---|
| Example 1 | 1a | 5 | 8c | 10 |
| Example 2 | 1a | 5 | 8c | 10 |

TABLE 1-continued

|  | | | | |
|---|---|---|---|---|
| Example 3 | 1a | 5 | 8a | 10 |
| Example 4 | 2a | 5 | 8c | 10 |
| Example 5 | 2a | 5 | 8c | 10 |
| Example 6 | 2a | 5 | 8a | 10 |
| Example 7 | 1a | 5 | 8c | 10 |
| Example 8 | 1a | 30 | 8c | 10 |
| Example 9 | 1a | 5 | 8c | 30 |
| Example 10 | 1a | 0.5 | 8c | 1 |
| Example 11 | 1a | 20 | 8c | 10 |
| Comparative Example 1 | 1a | 5 | — | — |
| Comparative Example 2 | 1a | 5 | — | — |
| Comparative Example 3 | 2a | 5 | — | — |
| Comparative Example 4 | 1a | 5 | 8a | 10 |

In Table 1, EMI-FIS represents ethylmethylimidazolium-bis(fluorosulfonyl)imide, and Pyr13-FSI represents methylpropylpyrrolidinium-bis(fluorosulfonyl)imide.

EXPERIMENTAL EXAMPLES

Experimental Example 1: Flame Retardancy (Self Combustion) Test

Self-extinguish time experiments, in which 1 g of each of the gel polymer electrolyte compositions for a lithium secondary battery prepared in Examples 1 to 11 and 1 g of each of the gel polymer electrolyte compositions for a lithium secondary battery prepared in Comparative Examples 1 to 4 were respectively ignited to measure time until each sample caught fire, were performed to evaluate flame retardancy. The results thereof are presented in Table 2 below.

TABLE 2

| | SET (seconds) |
|---|---|
| Example 1 | 0 |
| Example 2 | 0 |
| Example 3 | 0 |
| Example 4 | 0 |
| Example 5 | 0 |
| Example 6 | 0 |
| Example 7 | 0 |
| Example 8 | 0 |
| Example 9 | 0 |
| Example 10 | 0 |
| Example 11 | 0 |
| Comparative Example 1 | 10 |
| Comparative Example 2 | 5 |
| Comparative Example 3 | 5 |
| Comparative Example 4 | 5 |

Referring to Table 2, it may be understood that the gel polymer electrolyte compositions for a lithium secondary battery prepared in Examples 1 to 11 were not fired, but the gel polymer electrolyte composition of Comparative Example 1 which did not include the ionic liquid and heat stabilizer, but only included the carbonate-based solvent, the gel polymer electrolyte compositions of Comparative Examples 2 and 3 without the heat stabilizer, and the gel polymer electrolyte composition of Comparative Example 4 without the ionic liquid not only caught fire, but also times to catch fire (SET values) were short at 10 seconds or less.

From these results, it may be understood that flame retardancies of the gel polymer electrolyte compositions for a lithium secondary battery of Examples 1 to 11 were improved in comparison to those of the gel polymer electrolyte compositions of Comparative Examples 1 to 4.

Experimental Example 2: Calorific Value Test

The lithium secondary batteries prepared in Examples to 11 and the lithium secondary batteries prepared in Comparative Examples 1 to 4 were respectively fully charged to 4.2 V, and then disassembled to separate a positive electrode. After a positive electrode active material layer was scraped off from the positive electrode obtained from each lithium secondary battery to obtain powder, the powder was loaded into a differential scanning calorimeter (DSC, DSC-01, METTLER TOLEDO) and exothermic onset point and heat flow were measured while heating from 25° C. to 400° C. at a heating rate of 10° C./min. The DSC measurement was repeated three times or more to calculate an average value. The results thereof are presented in Table 3 below.

TABLE 3

| Sample | Exothermic onset point (° C.) | Heat flow (J/g) |
|---|---|---|
| Example 1 | 280 | 30.4 |
| Example 2 | 280 | 28.3 |
| Example 3 | 280 | 25.4 |
| Example 4 | 280 | 20.1 |
| Example 5 | 280 | 18.7 |
| Example 6 | 280 | 15.0 |
| Example 7 | 280 | 10< |
| Example 8 | 280 | 10< |
| Example 9 | 280 | 10< |
| Example 10 | 280 | 30 |
| Example 11 | 280 | 10< |
| Comparative Example 1 | 250 | 97.5 |
| Comparative Example 2 | 270 | 70.2 |
| Comparative Example 3 | 270 | 65.4 |
| Comparative Example 4 | 262 | 80.0 |

In general, a structure of the positive electrode in a fully charged state is in a state in which lithium is deintercalated, wherein, since the positive electrode is structurally unstable, an oxygen radical is generated while the structure is collapsed when the positive electrode is left standing at a high temperature. Since the oxygen radical generated in this case has very high reactivity, the oxygen radical causes an exothermic reaction while reacting with the electrolyte.

Referring to Table 3, with respect to the lithium secondary batteries prepared in Examples 1 to 11 which included the gel polymer electrolytes including the heat stabilizer and the ionic liquid having relatively low reactivity with the oxygen radical, it may be understood that exothermic reactions of the positive electrode active materials obtained were started from 280° C., and heat flows were about 30.4 J/g or less.

In contrast, with respect to the lithium secondary battery of Comparative Example 1 which included the gel polymer electrolyte not including both the ionic liquid and the heat stabilizer, it may be understood that an exothermic reaction was started from 250° C., a relatively low temperature, due to structural collapse of the positive electrode and a reaction of an oxygen radical generated in this case with the electrolyte, and heat flow was high at 97.5 J/g.

Also, with respect to the lithium secondary batteries of Comparative Examples 2 and 3 which included the gel polymer electrolytes without the heat stabilizer, it may be understood that exothermic onset points were increased to 270° C. due to the ionic liquid, but, since the effect was insignificant, heat flows were higher than those of the secondary batteries of Examples 1 to 11.

With respect to the lithium secondary battery of Comparative Example 4 which included the gel polymer electrolyte without the ionic liquid, it may be understood that an exothermic reaction was not only started from 262° C., a relatively low temperature, but heat flow was also high at 80.0 J/g.

From these results, it may be confirmed that high-temperature stabilities of the lithium secondary batteries of Examples 1 to 11 of the present invention were better than those of the secondary batteries of Comparative Examples 1 to 4.

Experimental Example 3: Hot Box Test

Hot box tests were performed in which the lithium secondary batteries prepared in Examples 1 to 11 and the lithium secondary batteries prepared in Comparative Examples 1 to 4 were heated to 150° C. at a heating rate of 5° C./min in a fully charged state, i.e., a state of charge (SOC) of 100%, and were then respectively left standing for 30 minutes to confirm the presence of ignition. The results thereof are presented in Table 4 below.

TABLE 4

| | Presence of ignition | Ignition start time (minutes) |
|---|---|---|
| Example 1 | x | — |
| Example 2 | x | — |
| Example 3 | x | — |
| Example 4 | x | — |
| Example 5 | x | — |
| Example 6 | x | — |
| Example 7 | x | — |
| Example 8 | x | — |
| Example 9 | x | — |
| Example 10 | x | — |
| Example 11 | x | — |
| Comparative Example 1 | ○ | 10 |
| Comparative Example 2 | ○ | 20 |
| Comparative Example 3 | ○ | 20 |
| Comparative Example 4 | ○ | 20 |

In Table 4, x represents a case where ignition did not occur during storage at 150° C., and ○ represents a case where ignition occurred during storage at 150° C.

Referring to Table 4, with respect to the lithium secondary batteries prepared in Examples 1 to 11, since stabilities of the positive structures were improved even during high-temperature storage in a fully charged state by the gel polymer electrolytes including the ionic liquid, exothermic reactions were reduced, and thus, it may be understood that thermal runaways of the lithium secondary batteries were suppressed. In addition, since thermal stabilities of the gel polymer electrolytes were significantly improved by the heat stabilizer included in the gel polymer electrolyte compositions, it may be understood that ignition did not occur even during high-temperature storage at 150° C.

In contrast, with respect to the lithium secondary battery of Comparative Example 1 which included the gel polymer electrolyte not including both the ionic liquid and the heat stabilizer, since a thermal runaway phenomenon occurred, it may be understood that ignition of the secondary battery occurred after 10 minutes after the temperature was increased to 150° C.

With respect to the secondary batteries of Comparative Examples 2 and 3 which included the gel polymer electrolytes including the ionic liquid, it may be understood that ignition of the batteries occurred after 20 minutes after the temperature was increased to 150° C. That is, with respect to the secondary batteries of Comparative Examples 2 and 3, it may be understood that ignition start times were increased in comparison to that of Comparative Example 1 due to the ionic liquid, but, ultimately, the ignition was not completely suppressed.

Also, with respect to the secondary battery of Comparative Example 4 which included the gel polymer electrolyte including the heat stabilizer, it may be understood that ignition of the battery occurred after 20 minutes after the temperature was increased to 150° C. That is, with respect to the secondary battery of Comparative Example 4, it may be understood that ignition start time was increased in comparison to that of Comparative Example 1, but, ultimately, the ignition was not completely suppressed.

The invention claimed is:

1. A gel polymer electrolyte composition for a lithium secondary battery, the gel polymer electrolyte composition comprising:

a lithium salt, a non-aqueous organic solvent, an ionic liquid, an oligomer, a heat stabilizer, and a polymerization initiator, wherein the ionic liquid is included in an amount of 10 wt % to 30 wt % based on a total weight of the gel polymer electrolyte composition for a lithium secondary battery, and the oligomer comprises at least one selected from the group consisting of oligomers represented by Formula 1 and Formula 2:

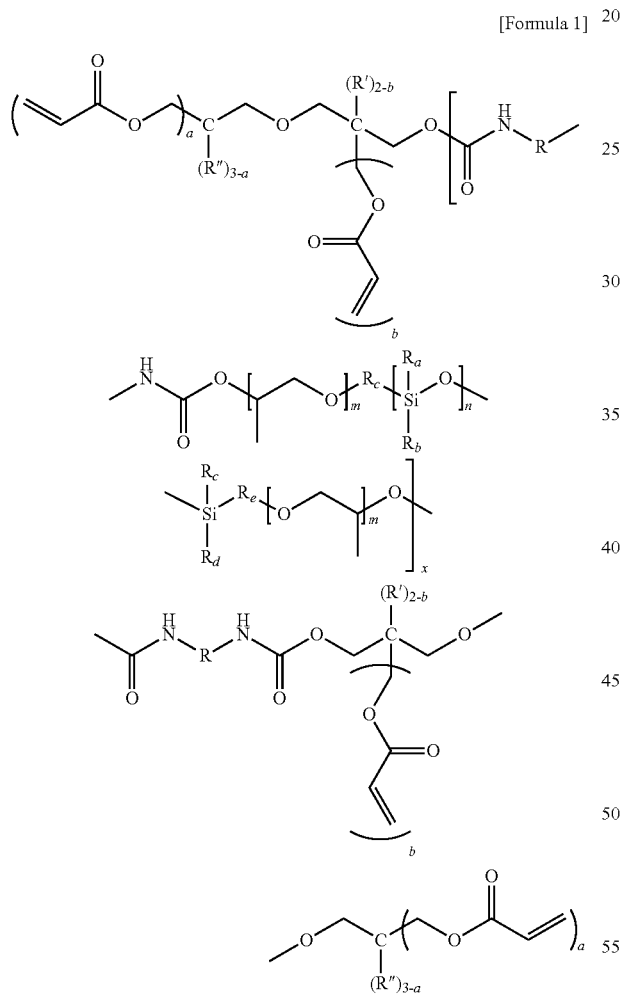

[Formula 1]

wherein, in Formula 1,

R is an aliphatic hydrocarbon group or an aromatic hydrocarbon group, $R_a$, $R_b$, $R_c$, and $R_d$ are each independently a substituted or unsubstituted alkyl group having 1 to 3 carbon atoms, $R_e$ is a substituted or unsubstituted alkylene group having 1 to 5 carbon atoms, R' and R'' are each independently hydrogen or an alkyl group having 1 to 3 carbon atoms, a is an integer of 1 to 3,
b is an integer of 0 to 2,
n, m, and x are numbers of repeating units,
n is an integer of 1 to 10,
m is an integer of 1 to 5, and
x is an integer of 1 to 15,

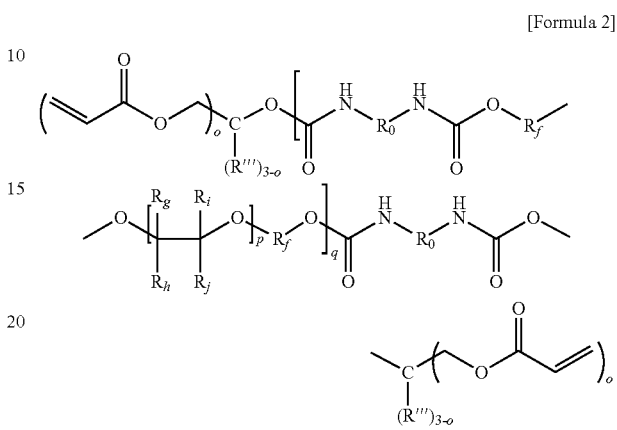

[Formula 2]

wherein, in Formula 2, $R_f$ is an alkylene group having 1 to 5 carbon atoms which is unsubstituted or substituted with at least one fluorine, $R_g$, $R_h$, $R_i$, and $R_j$ are each independently a fluorine element or a fluorine-substituted or unsubstituted alkyl group having 1 to 3 carbon atoms, $R_0$ is an aliphatic hydrocarbon group or an aromatic hydrocarbon group, R''' is hydrogen or an alkyl group having 1 to 3 carbon atoms, o is an integer of 1 to 3,
p and q are numbers of repeating units,
p is an integer of 1 to 10, and
q is an integer of 1 to 15,
wherein the heat stabilizer comprises a compound represented by Formula 8:

[Formula 8]

wherein, in Formula 8, $R_{17}$, $R_{18}$, and $R_{19}$ are each independently any one selected from the group consisting of H, F, —$CH_2C(CH_3)_3$, —$CF_3$, —$CF_2CF_3$, —$C(CF_3)_3$, —$C(CF_2CF_3)_3$, Cl, —$CCl_3$, —$CH_2CCl_3$, —$CF_2CCl_3$, —$C(CCl_3)_3$, —$C(CCl_2CCl_3)_3$, Br, —$CBr_3$, —$CH_2CBr_3$, —$CBr_2CBr_3$, —$C(CBr_3)_3$, —$C(CBr_2CBr_3)_3$, —I, —$CI_3$, —$CI_2CI_3$, —$C(CI_3)_3$, —$C(CI_2CI_3)_3$, —$Si(CH_3)_3$, —$Si(CH_2CH_3)_3$, —$SiF_3$, —$Si(CF_3)_3$, and —$Si(CF_2CF_3)_3$.

2. The gel polymer electrolyte composition for a lithium secondary battery of claim 1, wherein the ionic liquid comprises:

at least one anion component selected from the group consisting of $BF_4^-$, $PF_6^-$, $ClO_4^-$, bis(fluorosulfonyl) imide ($N(SO_2F)_2^-$; FSI), (bis)trifluoromethanesulfonimide (N(SO$_2$CF$_3$)$_2^-$, TFSI), bisperfluoroethanesulfonimide (N(SO$_2$C$_2$F$_5$)$_2^-$, BETI), and oxalyldifluoroborate (BF$_2$(C$_2$O$_4$)$^-$, ODFB), and at least one cation component selected from the group consisting of cations represented by Formulae 3 to 7:

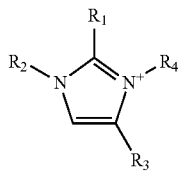

[Formula 3]

wherein, in Formula 3,
R$_1$, R$_2$, R$_3$, and R$_4$ are each independently hydrogen or an alkyl group having 1 to 5 carbon atoms,

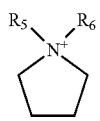

[Formula 4]

wherein, in Formula 4,
R$_5$ and R$_6$ are each independently an alkyl group having 1 to 5 carbon atoms,

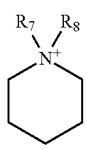

[Formula 5]

wherein, in Formula 5,
R$_7$ and R$_8$ are each independently an alkyl group having 1 to 5 carbon atoms,

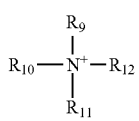

[Formula 6]

wherein, in Formula 6,
R$_9$, R$_{10}$, R$_{11}$, and R$_{12}$ are each independently an alkyl group having 1 to 5 carbon atoms,

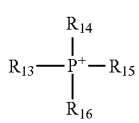

[Formula 7]

wherein, in Formula 7,
R$_{13}$, R$_{14}$, R$_{15}$, and R$_{16}$ are each independently an alkyl group having 1 to 5 carbon atoms.

3. The gel polymer electrolyte composition for a lithium secondary battery of claim 2, wherein the cation component represented by Formula 3 comprises at least one selected from the group consisting of cations represented by Formulae 3a and 3b:

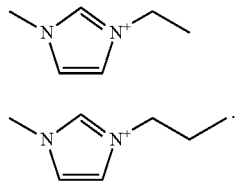

[Formula 3a]

[Formula 3b]

4. The gel polymer electrolyte composition for a lithium secondary battery of claim 2, wherein the cation component represented by Formula 4 comprises at least one selected from the group consisting of cations represented by Formulae 4a and 4b:

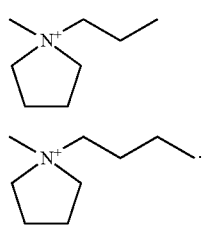

[Formula 4a]

[Formula 4b]

5. The gel polymer electrolyte composition for a lithium secondary battery of claim 2, wherein the cation component represented by Formula 5 comprises at least one selected from the group consisting of cations represented by Formulae 5a and 5b:

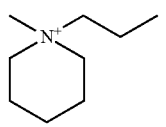

[Formula 5a]

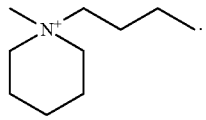

[Formula 5a]

6. The gel polymer electrolyte composition for a lithium secondary battery of claim 2, wherein the cation component represented by Formula 7 comprises a cation represented by Formula 7a:

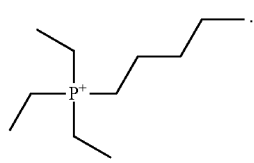

[Formula 7a]

7. The gel polymer electrolyte composition for a lithium secondary battery of claim 1, wherein the oligomer comprises the oligomer represented by Formula 1, wherein the aliphatic hydrocarbon group of R comprises at least one selected from the group consisting of (a) an alicyclic hydrocarbon group and (b) a linear hydrocarbon group,
(a) the alicyclic hydrocarbon group is selected from the group consisting of a substituted or unsubstituted cycloalkylene group having 4 to 20 carbon atoms, a substituted or unsubstituted cycloalkenylene group having 4 to 20 carbon atoms, and a substituted or unsubstituted heterocycloalkylene group having 2 to 20 carbon atoms,
(b) the linear hydrocarbon group is selected from the group consisting of a substituted or unsubstituted alkylene group having 1 to 20 carbon atoms, a substituted or unsubstituted alkoxylene group having 1 to 20 carbon atoms, a substituted or unsubstituted alkenylene group having 2 to 20 carbon atoms, and a substituted or unsubstituted alkynylene group having 2 to 20 carbon atoms, and the aromatic hydrocarbon group of R comprises at least one selected from the group consisting of a substituted or unsubstituted arylene group having 6 to 20 carbon atoms and a substituted or unsubstituted heteroarylene group having 2 to 20 carbon atoms.

8. The gel polymer electrolyte composition for a lithium secondary battery of claim 1, wherein the oligomer comprises the oligomer represented by Formula 1, and the oligomer represented by Formula 1 comprises an oligomer represented by Formula 1a:

[Formula 1a]

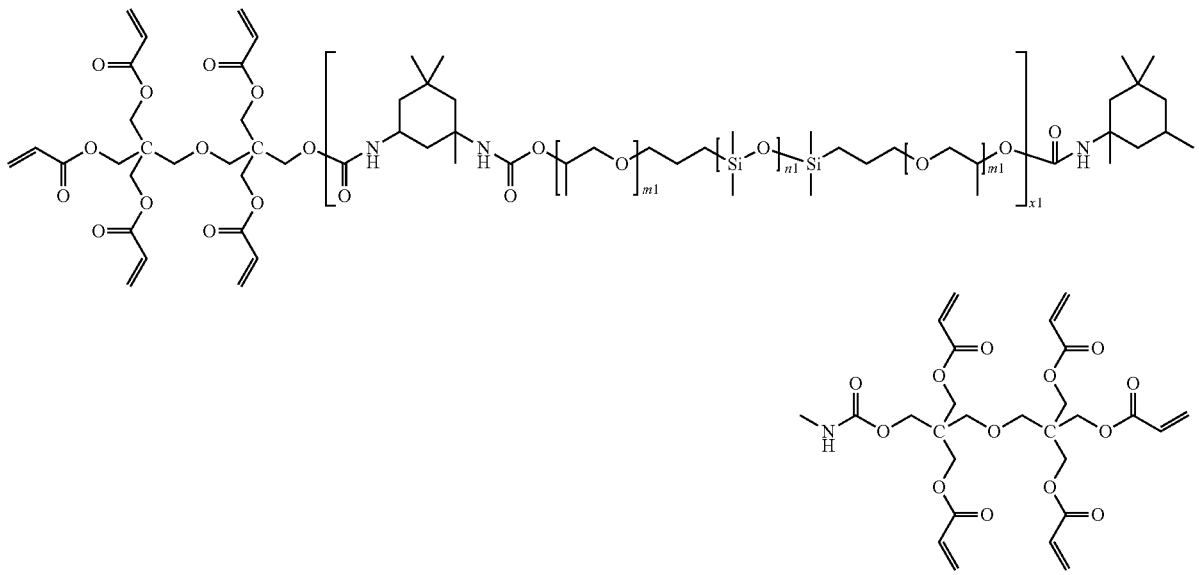

wherein, in Formula 1a,
n1, m1, and x1 are numbers of repeating units,
n1 is an integer of 1 to 10,
m1 is an integer of 1 to 5, and
x1 is an integer of 1 to 15.

9. The gel polymer electrolyte composition for a lithium secondary battery of claim 1, wherein the oligomer comprises the oligomer represented by Formula 2, and the oligomer represented by Formula 2 comprises an oligomer represented by Formula 2a:

[Formula 2a]

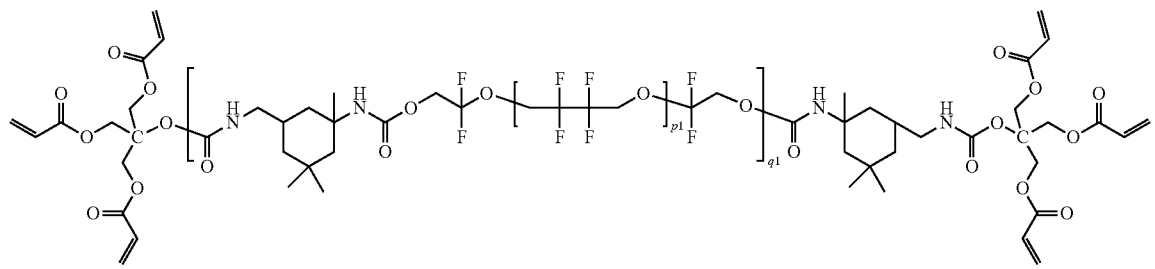

wherein, in Formula 2a,
p1 and q1 are numbers of repeating units,
p1 is an integer of 1 to 10, and
q1 is an integer of 1 to 15.

10. The gel polymer electrolyte composition for a lithium secondary battery of claim 1, wherein the oligomer is included in an amount of 0.1 wt % to 30 wt % based on a total weight of the gel polymer electrolyte composition for a lithium secondary battery.

11. The gel polymer electrolyte composition for a lithium secondary battery of claim 1, wherein the compound represented by Formula 8 comprises at least one selected from the group consisting of compounds represented by Formulae 8a, 8b, 8d, 8e and 8f:

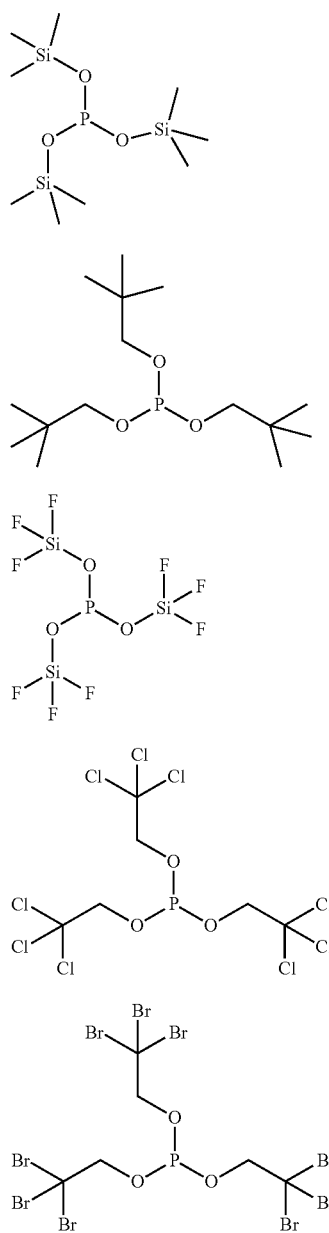

[Formula 8a]

[Formula 8b]

[Formula 8d]

[Formula 8e]

[Formula 8f]

12. The gel polymer electrolyte composition for a lithium secondary battery of claim 1, wherein the heat stabilizer is included in an amount of 1 wt % to 30 wt % based on a total weight of the gel polymer electrolyte composition for a lithium secondary battery.

13. A gel polymer electrolyte prepared by polymerizing the gel polymer electrolyte composition for a lithium secondary battery of claim 1.

14. A lithium secondary battery comprising a positive electrode, a negative electrode, a separator, and the gel polymer electrolyte of claim 13.

15. The lithium secondary battery of claim 14, wherein the positive electrode comprises a positive electrode active material represented by Formula 9:

$$Li(Ni_{a1}Co_{b1}Mn_{c1})O_2 \qquad \text{[Formula 9]}$$

wherein, in Formula 9,
$0.8 \leq a1 < 0.9$, $0.05 < b1 < 0.17$, $0.05 < c1 < 0.17$, and $a1+b1+c1=1$.

16. The gel polymer electrolyte composition for a lithium secondary battery of claim 1, wherein the oligomer comprises the oligomer represented by Formula 2, where the aliphatic hydrocarbon group of $R_O$ comprises at least one selected from the group consisting of (a) at least one alicyclic hydrocarbon group and (b) at least one linear hydrocarbon group, wherein:

(a) the alicyclic hydrocarbon group is selected from the group consisting of a substituted or unsubstituted cycloalkylene group having 4 to 20 carbon atoms, a substituted or unsubstituted cycloalkenylene group having 4 to 20 carbon atoms, and a substituted or unsubstituted heterocycloalkylene group having 2 to 20 carbon atoms, (b) the linear hydrocarbon group is selected from the group consisting of a substituted or unsubstituted alkylene group having 1 to 20 carbon atoms, a substituted or unsubstituted alkoxylene group having 1 to 20 carbon atoms, a substituted or unsubstituted alkenylene group having 2 to 20 carbon atoms, and a substituted or unsubstituted alkynylene group having 2 to 20 carbon atoms, and the aromatic hydrocarbon group of $R_O$ comprises at least one selected from the group consisting of a substituted or unsubstituted arylene group having 6 to 20 carbon atoms and a substituted or unsubstituted heteroarylene group having 2 to 20 carbon atoms.

17. The gel polymer electrolyte composition for a lithium secondary battery of claim 1, wherein a weight-average molecular weight (Mw) of the oligomer represented by Formula 1 or Formula 2 is in a range of about 1,000 g/mol to about 100,000 g/mol.

18. The gel polymer electrolyte composition for a lithium secondary battery of claim 1, wherein a weight-average molecular weight (Mw) of the oligomer represented by Formula 1 or Formula 2 is in a range of about 1,000 g/mol to about 50,000 g/mol.

* * * * *